(12) United States Patent
Nishino et al.

(10) Patent No.: US 9,129,611 B2
(45) Date of Patent: Sep. 8, 2015

(54) VOICE ANALYZER AND VOICE ANALYSIS SYSTEM

(75) Inventors: Yohei Nishino, Kanagawa (JP); Haruo Harada, Kanagawa (JP); Kei Shimotani, Kanagawa (JP); Hirohito Yoneyama, Kanagawa (JP); Kiyoshi Iida, Kanagawa (JP); Akira Fujii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 615 days.

(21) Appl. No.: 13/465,230

(22) Filed: May 7, 2012

(65) Prior Publication Data

US 2013/0173266 A1 Jul. 4, 2013

(30) Foreign Application Priority Data

Dec. 28, 2011 (JP) .................. 2011-288616

(51) Int. Cl.
*G10L 25/51* (2013.01)
*G10L 17/00* (2013.01)

(52) U.S. Cl.
CPC *G10L 25/51* (2013.01); *G10L 17/00* (2013.01)

(58) Field of Classification Search
CPC ............ G10L 15/20; G10L 17/00; G10L 2021/02082; G10L 15/24; G10L 2021/02165; G10L 21/0208; G10L 25/78; G10L 21/02; G10L 25/51; G10L 25/84; H04R 25/407; G10K 11/1782
USPC ............. 704/215, 236, 246, 270, 270.1
See application file for complete search history.

(56) References Cited

U.S. PATENT DOCUMENTS

| 4,581,758 | A | * | 4/1986 | Coker et al. .................. 381/56 |
| 5,031,881 | A |   | 7/1991 | Thurmston |
| 5,033,089 | A |   | 7/1991 | Fujimoto et al. |
| 5,267,323 | A | * | 11/1993 | Kimura .................. 381/110 |
| 5,778,082 | A | * | 7/1998 | Chu et al. .................. 381/92 |
| 5,793,875 | A |   | 8/1998 | Lehr et al. |
| 6,263,836 | B1 |  | 7/2001 | Hollis |

(Continued)

FOREIGN PATENT DOCUMENTS

| JP | A-61-72500 | 4/1986 |
| JP | S62-141594 A | 6/1987 |

(Continued)

OTHER PUBLICATIONS

Oct. 24, 2014 Office Action issued in U.S. Appl. No. 13/475,378.

(Continued)

*Primary Examiner* — Abdelali Serrou
(74) *Attorney, Agent, or Firm* — Oliff PLC

(57) ABSTRACT

A voice analyzer includes a first voice acquisition unit provided in a place where a distance of a sound wave propagation path from a mouth of a user is a first distance, plural second voice acquisition units provided in places where distances of sound wave propagation paths from the mouth of the user are smaller than the first distance, and an identification unit that identifies whether the voices acquired by the first and second voice acquisition units are voices of the user or voices of others excluding the user on the basis of a result of comparison between first sound pressure of a voice signal of the voice acquired by the first voice acquisition unit and second sound pressure calculated from sound pressure of a voice signal of the voice acquired by each of the plural second voice acquisition units.

14 Claims, 17 Drawing Sheets

(56) References Cited

U.S. PATENT DOCUMENTS

| | | | |
|---|---|---|---|
| 6,513,532 B2 | 2/2003 | Mault et al. | |
| 6,549,792 B1 | 4/2003 | Cannon et al. | |
| 6,697,778 B1* | 2/2004 | Kuhn et al. | 704/243 |
| 6,956,564 B1 | 10/2005 | Williams | |
| 7,171,007 B2* | 1/2007 | Rajan | 381/92 |
| 7,246,033 B1 | 7/2007 | Kudo | |
| 7,312,981 B2 | 12/2007 | Carroll | |
| 7,379,553 B2* | 5/2008 | Nakajima et al. | 381/92 |
| 7,409,065 B2* | 8/2008 | Lo | 381/92 |
| 8,005,672 B2* | 8/2011 | Vierthaler et al. | 704/233 |
| 8,019,386 B2* | 9/2011 | Dunn et al. | 455/563 |
| 8,031,881 B2 | 10/2011 | Zhang | |
| 8,065,115 B2* | 11/2011 | Chen | 702/191 |
| 8,121,673 B2 | 2/2012 | Tran | |
| 8,155,345 B2* | 4/2012 | Tagawa et al. | 381/92 |
| 8,155,346 B2* | 4/2012 | Yoshizawa et al. | 381/92 |
| 8,351,618 B2* | 1/2013 | Bai et al. | 381/92 |
| 8,401,513 B2* | 3/2013 | Langereis et al. | 455/401 |
| 8,442,833 B2* | 5/2013 | Chen | 704/270 |
| 8,611,554 B2* | 12/2013 | Short et al. | 381/74 |
| 8,767,975 B2* | 7/2014 | Short | 381/92 |
| 2001/0034250 A1 | 10/2001 | Chadha | |
| 2001/0040969 A1* | 11/2001 | Revit et al. | 381/60 |
| 2004/0064056 A1* | 4/2004 | Ogura | 600/490 |
| 2005/0027515 A1* | 2/2005 | Huang et al. | 704/215 |
| 2005/0085185 A1* | 4/2005 | Patterson | 455/3.06 |
| 2007/0136064 A1 | 6/2007 | Carroll | |
| 2008/0317260 A1* | 12/2008 | Short | 381/92 |
| 2009/0076827 A1 | 3/2009 | Bulitta et al. | |
| 2009/0164219 A1 | 6/2009 | Yeung et al. | |
| 2009/0185696 A1 | 7/2009 | Horibe et al. | |
| 2009/0190769 A1 | 7/2009 | Wang et al. | |
| 2010/0195836 A1* | 8/2010 | Platz | 381/26 |
| 2010/0303254 A1* | 12/2010 | Yoshizawa et al. | 381/92 |
| 2011/0103617 A1 | 5/2011 | Shin | |
| 2011/0176690 A1 | 7/2011 | Takano et al. | |
| 2011/0255702 A1 | 10/2011 | Jensen | |
| 2011/0293103 A1 | 12/2011 | Park et al. | |
| 2013/0024196 A1 | 1/2013 | Ganong, III et al. | |
| 2013/0166299 A1 | 6/2013 | Shimotani et al. | |
| 2013/0173266 A1 | 7/2013 | Nishino et al. | |
| 2013/0272540 A1* | 10/2013 | hgren et al. | 381/94.1 |
| 2014/0010397 A1 | 1/2014 | Merks | |

FOREIGN PATENT DOCUMENTS

| | | |
|---|---|---|
| JP | S62-141595 A | 6/1987 |
| JP | S63-165900 A | 7/1988 |
| JP | S63-226691 A | 9/1988 |
| JP | H07-191688 A | 7/1995 |
| JP | H08-191496 A | 7/1996 |
| JP | 2000-338987 A | 12/2000 |
| JP | 2002-006874 A | 1/2002 |
| JP | 2002-149191 A | 5/2002 |
| JP | 2006-023773 A | 1/2006 |
| JP | 2006-071936 A | 3/2006 |
| JP | 2008-072158 A | 3/2008 |
| JP | 2009-109868 A | 5/2009 |
| WO | 2006/028587 A2 | 3/2006 |

OTHER PUBLICATIONS

Jun. 6, 2014 Office Action issued in U.S. Appl. No. 13/412,214.
Sep. 11, 2014 Office Action issued in U.S. Appl. No. 13/565,365.
U.S. Appl. No. 13/565,365, filed Aug. 2, 2012 in the name of Yoneyama et al.
U.S. Appl. No. 13/475,378, filed May 18, 2012 in the name of Nishino et al.
U.S. Appl. No. 13/412,214, filed Mar. 5, 2012 in the name of Harada et al.
May 12, 2015 Office Action issued in U.S. Appl. No. 13/475,378.

* cited by examiner

FIG. 1
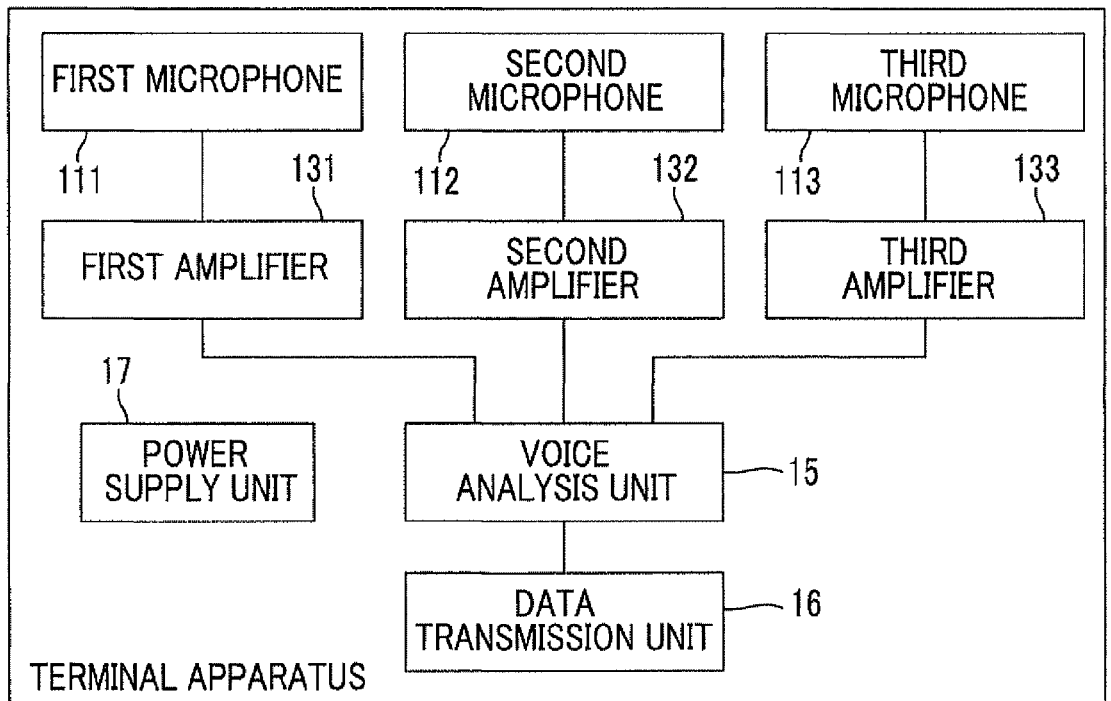
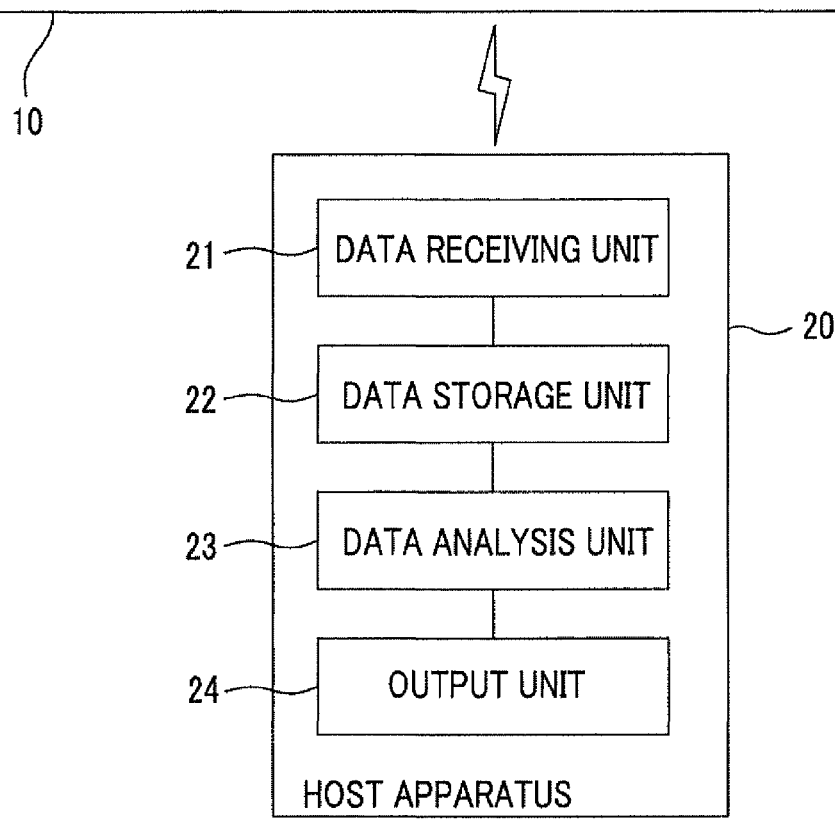

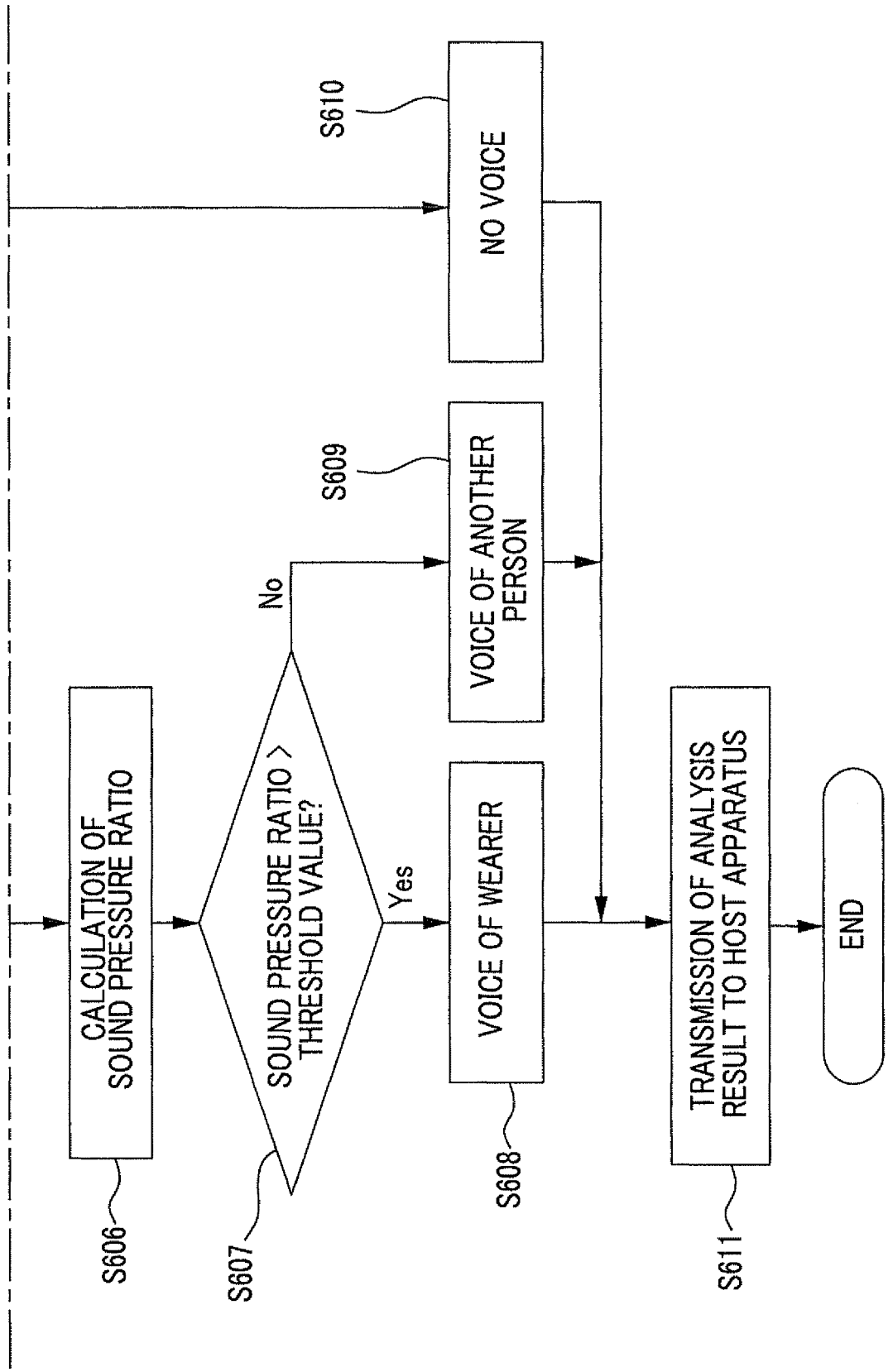

FIG. 7
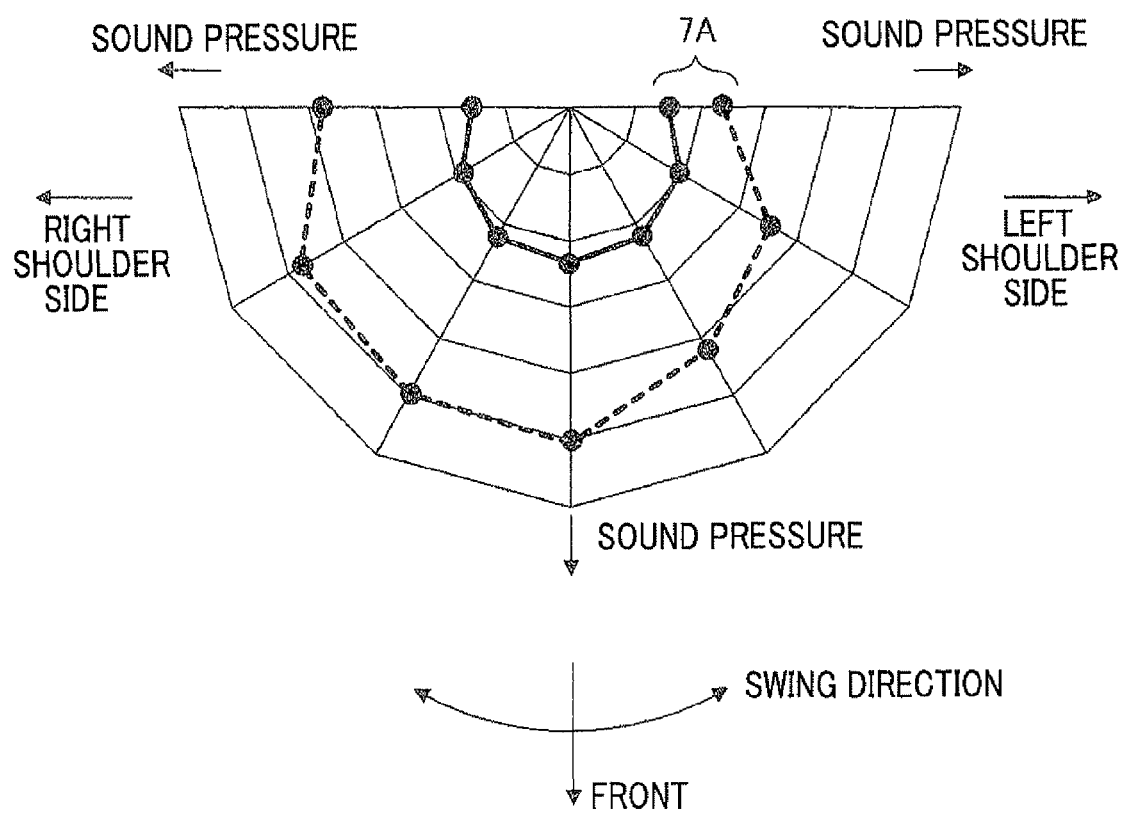

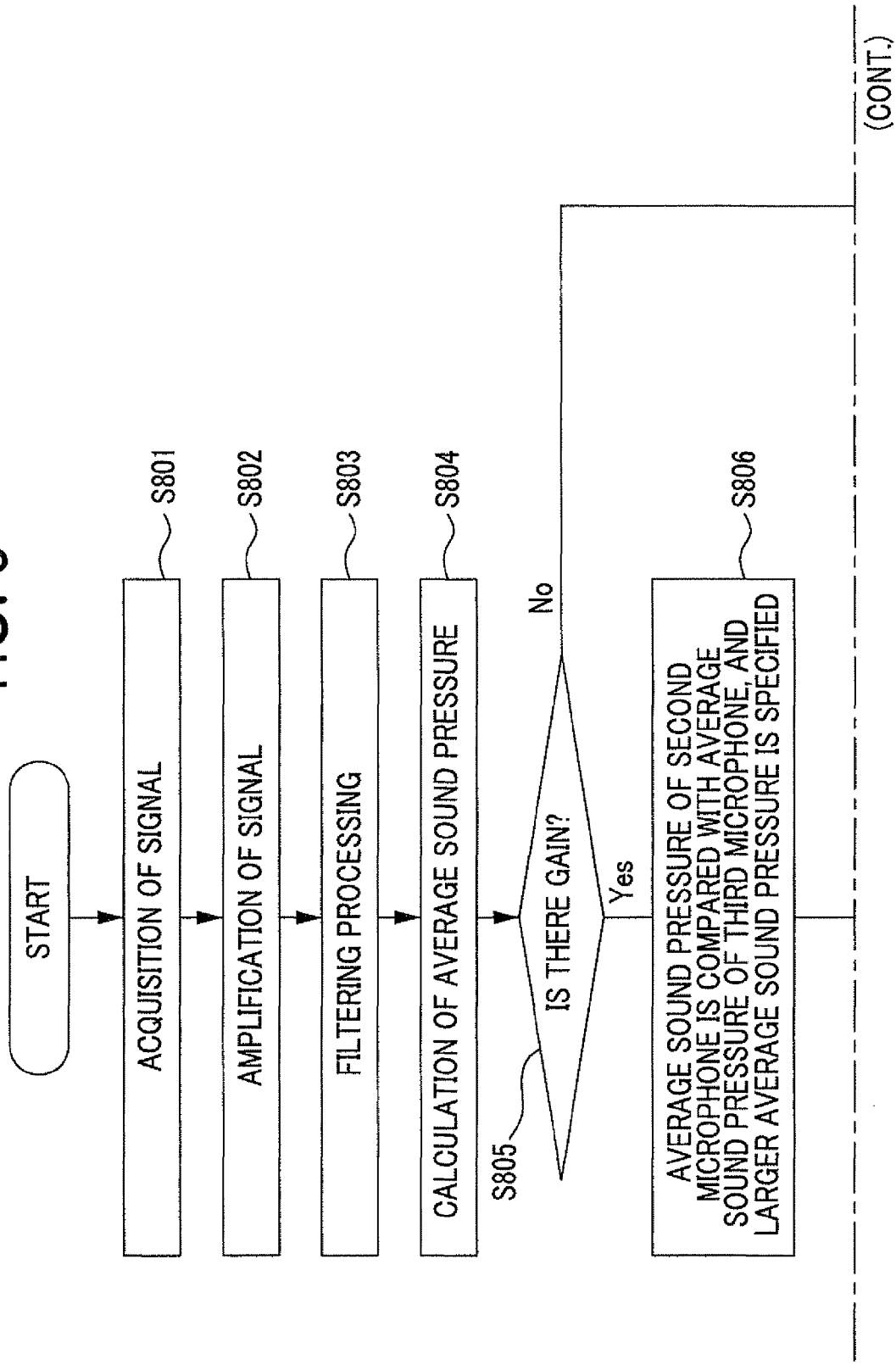

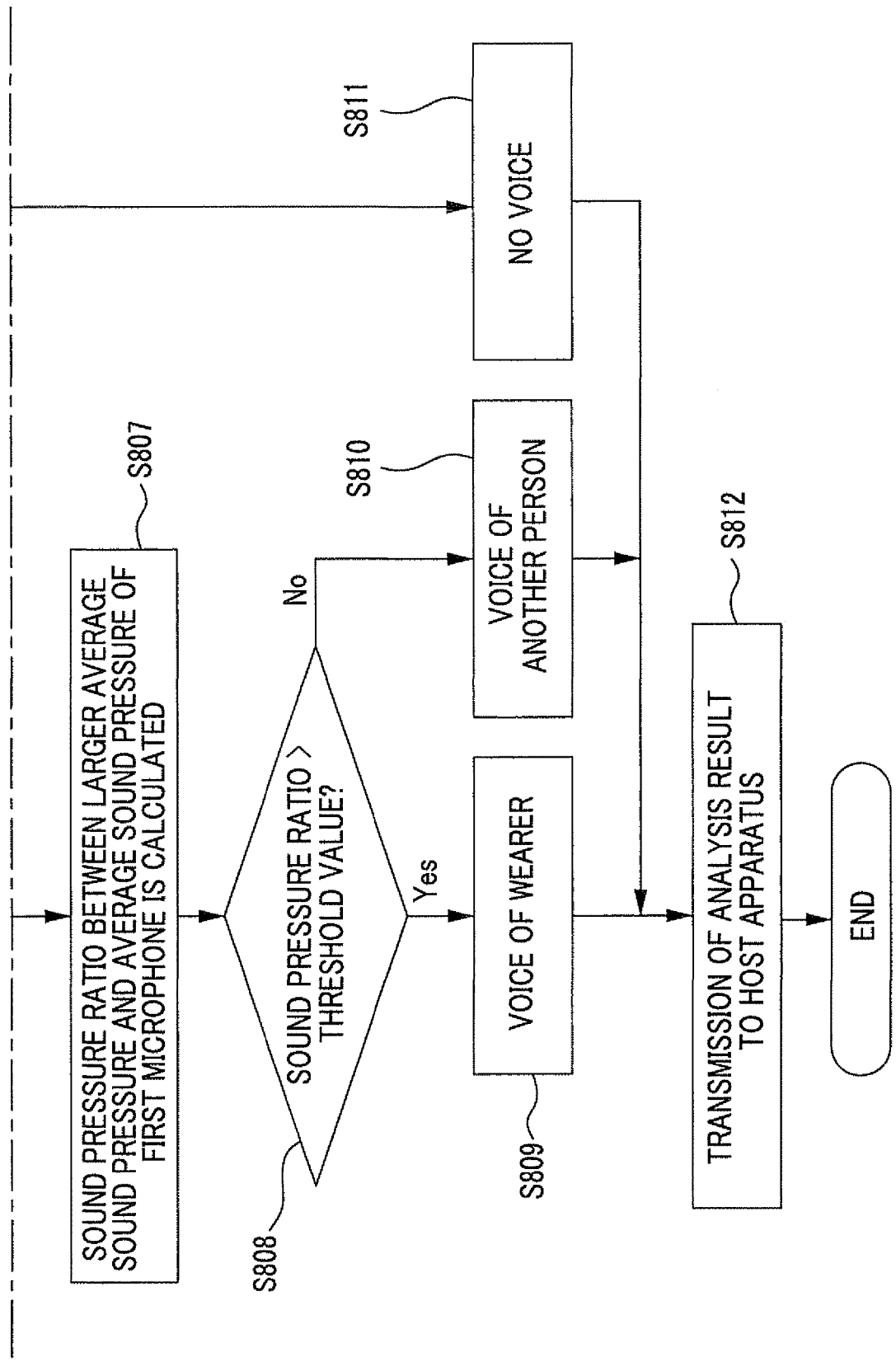

FIG. 9
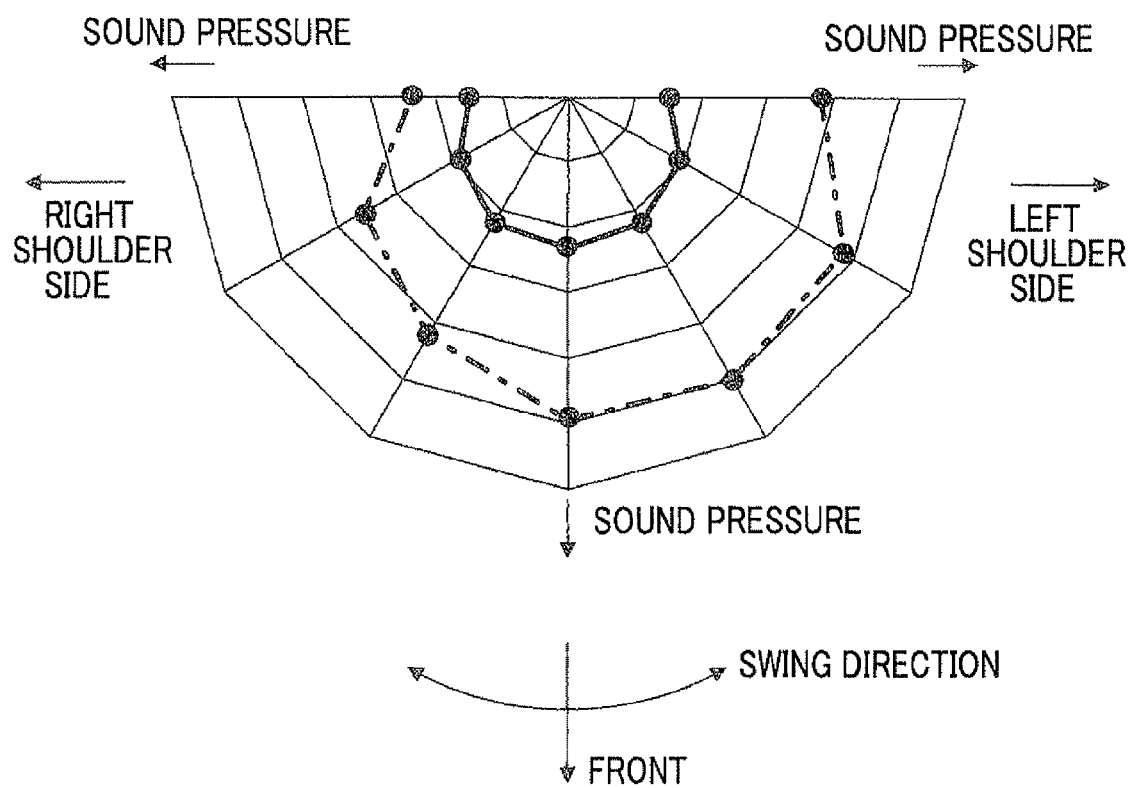
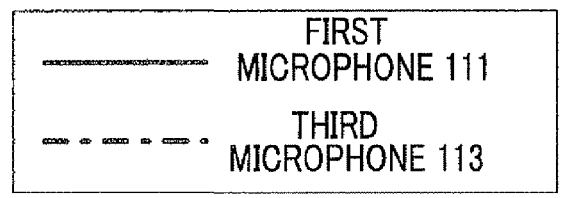

FIG. 11
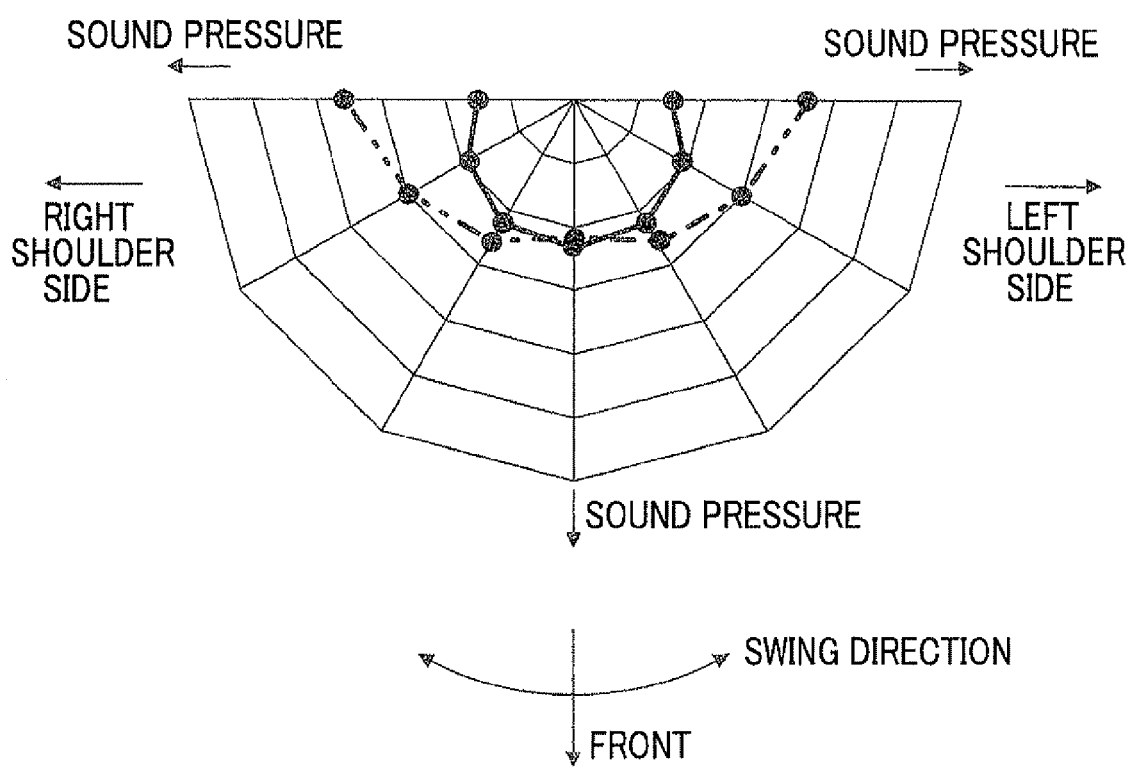
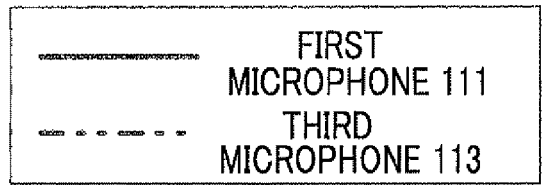

FIG. 14
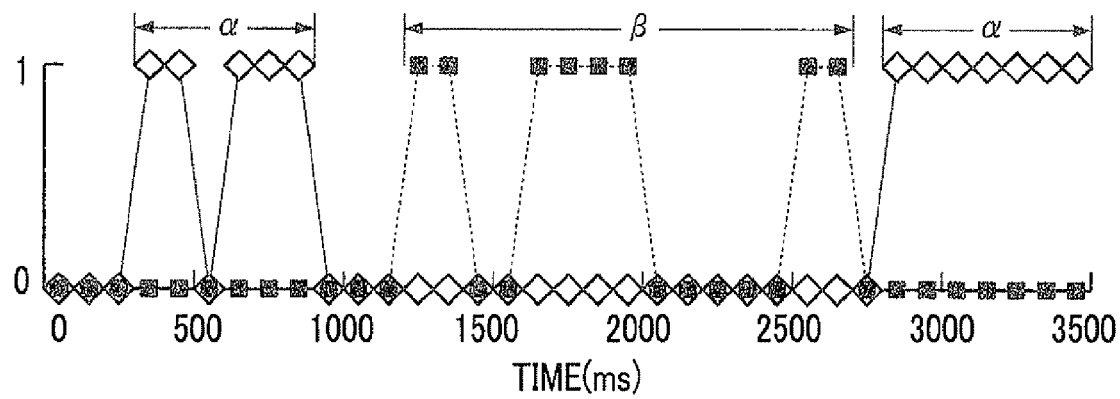
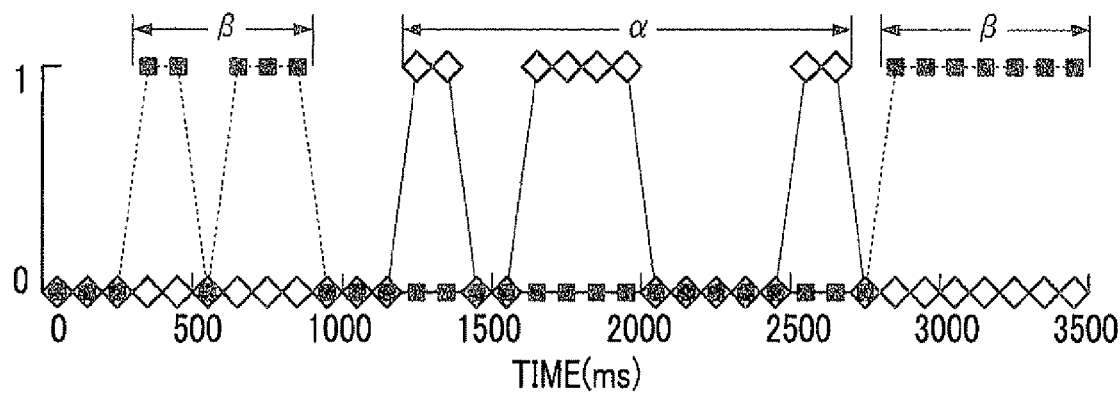

VOICE ANALYZER AND VOICE ANALYSIS SYSTEM

CROSS-REFERENCE TO RELATED APPLICATIONS

This application is based on and claims priority under 35 USC 119 from Japanese Patent Application No. 2011-288616 filed Dec. 28, 2011.

BACKGROUND

Technical Field

The present invention relates to a voice analyzer and a voice analysis system.

SUMMARY

According to an aspect of the invention, there is provided a voice analyzer including: a first voice acquisition unit that is provided in a place where a distance of a sound wave propagation path from a mouth of a user is a first distance and that acquires a voice of the user; plural second voice acquisition units that are provided in places where distances of sound wave propagation paths from the mouth of the user are smaller than the first distance and that acquire a voice of the user; and an identification unit that identifies whether the voices acquired by the first and second voice acquisition units are voices of the user or voices of others excluding the user on the basis of a result of comparison between first sound pressure of a voice signal of the voice acquired by the first voice acquisition unit and second sound pressure calculated from sound pressure of a voice signal of the voice acquired by each of the plural second voice acquisition units.

BRIEF DESCRIPTION OF THE DRAWINGS

Exemplary embodiments of the present invention will be described in detail based on the following figures, wherein:

FIG. 1 is a view showing an example of the configuration of a voice analysis system according to an exemplary embodiment;

FIG. 7 is a view showing the relationship between a direction, in which a wearer faces, and the sound pressure of a recorded voice;

FIG. 8 is a view showing the flow of processing when three microphones of first to third microphones are used;

FIG. 9 is a view showing the sound pressure of each of first and third microphones when a wearer turns his or her head;

FIG. 11 is a view showing the sound pressure of each of first and third microphones when a wearer turns his or her head;

FIG. 14 is a view showing an example of the speaking information of each terminal apparatus in the conversation situation shown in FIG. 13.

DETAILED DESCRIPTION

Figure 2:
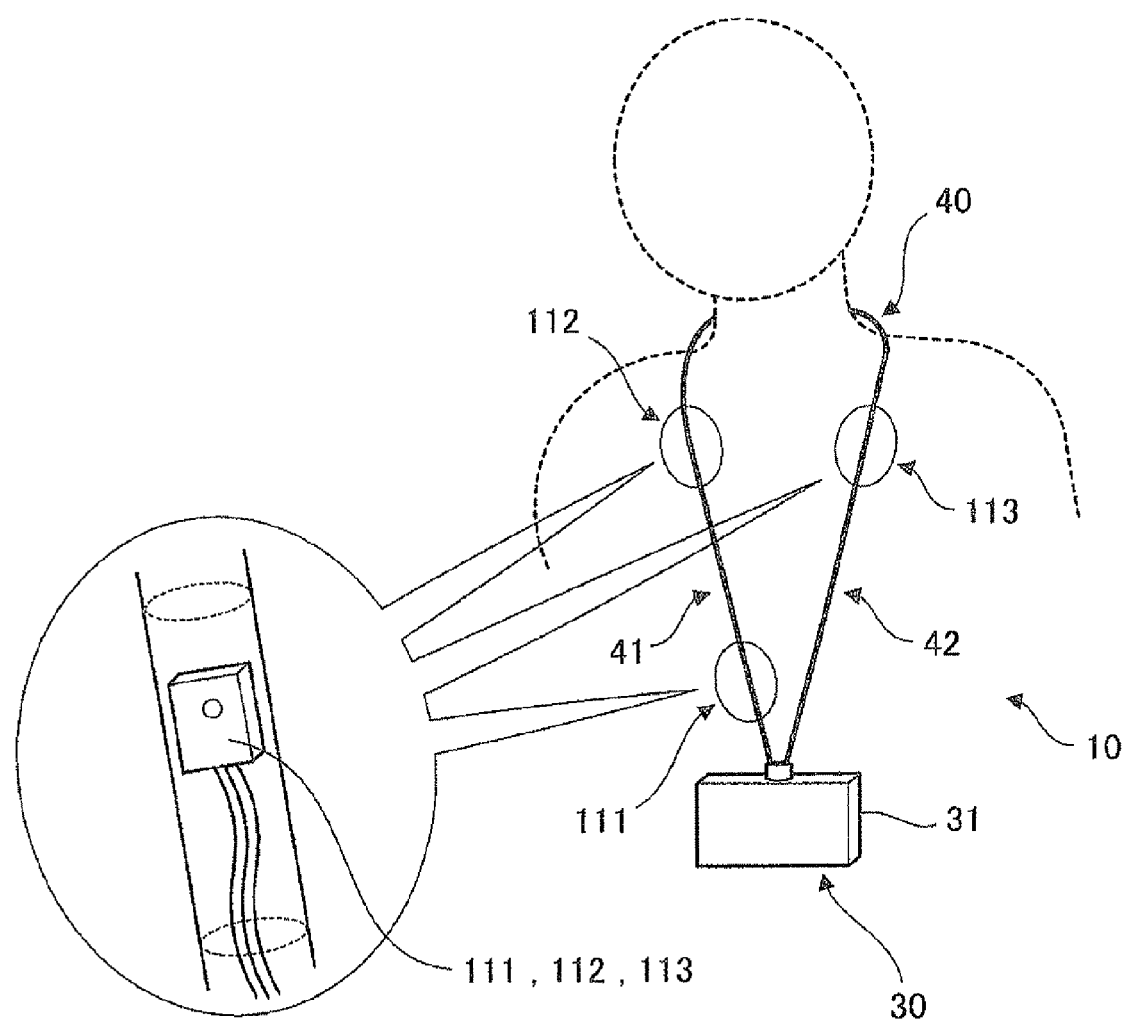
FIG. 2 is a view showing an example of the configuration of a terminal apparatus.

Hereinafter, an exemplary embodiment of the invention will be described in detail with reference to the accompanying drawings.

Example of the System Configuration

FIG. 1 is a view showing an example of the configuration of a voice analysis system according to the present exemplary embodiment.

As shown in FIG. 1, the system according to the present exemplary embodiment is configured to include a terminal apparatus 10 and a host apparatus 20. The terminal apparatus 10 and the host apparatus 20 are connected to each other through a wireless communication line. As the wireless communication line, lines based on the known methods, such as Wi-Fi (registered trademark) (Wireless Fidelity), Bluetooth (registered trademark), ZigBee (registered trademark), and UWB (Ultra Wideband), may be used. In addition, although only one terminal apparatus 10 is described in the example shown in FIG. 1, as many terminal apparatuses 10 as there are users are prepared in practice since the terminal apparatus 10 is used in a state worn by the user. This will be described in detail later. Hereinafter, the user who wears the terminal apparatus 10 is called a wearer.

The terminal apparatus 10 as an example of the voice analyzer includes at least three microphones (a first microphone 111, a second microphone 112, and a third microphone 113) and amplifiers (a first amplifier 131, a second amplifier 132, and a third amplifier 133). In addition, the terminal apparatus 10 includes a voice analysis unit 15 that analyzes the recorded voice and a data transmission unit 16 that transmits an analysis result to the host apparatus 20, and further includes a power supply unit 17.

The first to third microphones 111 to 113 are disposed at different positions, at which distances of sound wave propagation paths from the mouth (speaking portion) of the wearer (hereinafter, simply referred to as "distances") are different.

Here, the first microphone 111 as an example of a first voice acquisition unit is disposed at the position (for example, about 35 cm) far from the mouth (speaking portion) of the wearer. In addition, the second and third microphones 112 and 113 as examples of a second voice acquisition unit are disposed at the position (for example, about 10 cm) close to the mouth (speaking portion) of the wearer. In addition, the second and third microphones 112 and 113 are disposed such that the distance between the mouth of the wearer and the second microphone 112 and the distance between the mouth of the wearer and the third microphone 113 are the same.

Various types of known microphones, such as a dynamic type microphone and a capacitor type microphone, may be used as the first to third microphones 111 to 113 in the present exemplary embodiment. In particular, it is preferable to use a non-directional MEMS (Micro Electro Mechanical Systems) type microphone.

The first to third amplifiers 131 to 133 amplify electric signals (voice signals) that the first to third microphones 111 to 113 output according to the acquired voice. Known operational amplifiers or the like may be used as the first to third amplifiers 131 to 133 in the present exemplary embodiment.

The voice analysis unit 15 analyzes the voice signals output from the first to third amplifiers 131 to 133. In addition, the voice analysis unit 15 determines whether the voice acquired by the first to third microphones 111 to 113 is a voice from the wearer, who wears the terminal apparatus 10, or voices from others. That is, the voice analysis unit 15 functions as a speaker identification unit that identifies a speaker of the voice on the basis of voices acquired by the first to third microphones 111 to 113. Details of specific processing for identification of a speaker will be described later.

The data transmission unit 16 transmits the acquired data including the analysis result of the voice analysis unit 15 and the ID of the terminal apparatus 10 to the host apparatus through the wireless communication line. As the information transmitted to the host apparatus 20, for example, information regarding the voice acquisition time, sound pressure of the acquired voice, and the like of the first to third microphones 111 to 113 may be included in addition to the analysis result according to processing performed in the host apparatus 20. In addition, a data storage unit that stores the analysis result of the voice analysis unit 15 may be provided in the terminal apparatus 10, and data stored for a certain period of time may be collectively transmitted. In addition, the data may be transmitted through a cable line.

The power supply unit 17 supplies electric power to the first to third microphones 111 to 113, the first to third amplifiers 131 to 133, the voice analysis unit 15, and the data transmission unit 16. As a power supply, it is possible to use known power supplies, such as a dry battery and a rechargeable battery, for example. In addition, the power supply unit 17 includes known circuits, such as a voltage conversion circuit and a charging control circuit, when necessary.

The host apparatus 20 includes a data receiving unit 21 that receives the data transmitted from the terminal apparatus 10, a data storage unit 22 that stores the received data, a data analysis unit 23 that analyzes the stored data, and an output unit 24 that outputs an analysis result. The host apparatus 20 is realized by an information processing apparatus, such as a personal computer, for example. Moreover, in the present exemplary embodiment, the plural terminal apparatuses 10 are used as described above, and the host apparatus 20 receives the data from each of the plural terminal apparatuses 10.

The data receiving unit 21 corresponds to the wireless communication line described above, and receives the data from each terminal apparatus 10 and transmits it to the data storage unit 22. The data storage unit 22 is realized by a memory of a magnetic disk device of a personal computer, for example, and stores the received data acquired from the data receiving unit 21 for each speaker. Here, identification of a speaker is performed on the basis of a terminal ID transmitted from the terminal apparatus 10 and a combination of a speaker name and a terminal ID registered in the host apparatus 20 in advance. In addition, instead of the terminal ID, a wearer name may be transmitted from the terminal apparatus 10.

The data analysis unit 23 is realized by a CPU program-controlled by a personal computer, for example, and analyzes the data stored in the data storage unit 22. As the specific analysis content and analysis method, various kinds of content and methods may be adopted depending on the purpose or aspect of use of the system according to the present exemplary embodiment. For example, the frequency of conversation between wearers of the terminal apparatus 10 or the tendency of a conversation partner of each wearer is analyzed, or the relationship of speakers in a conversation is estimated from the information regarding the length or sound pressure of each voice in the conversation.

The output unit 24 outputs an analysis result of the data analysis unit 23 or performs output based on the analysis result. As the output unit, various kinds of units including display of a display device, printout using a printer, and voice output may be adopted according to the purpose or aspect of use of the system, the content or format of an analysis result, and the like.

Example of the Configuration of a Terminal Apparatus

FIG. 2 is a view showing an example of the configuration of the terminal apparatus 10.

As described above, the terminal apparatus 10 is used in a state worn by each user. The terminal apparatus 10 in the present exemplary embodiment is configured to include an apparatus body 30 and a hanging string 40 connected to the apparatus body 30 so that the user may wear the terminal apparatus 10, as shown in FIG. 2. In the configuration shown in FIG. 2, the user wears the hanging string 40 on the neck so that the apparatus body 30 is hung from the neck.

The apparatus body 30 is configured such that at least circuits for realizing the first to third amplifiers 131 to 133, the voice analysis unit 15, the data transmission unit 16, and the power supply unit 17 and a power supply (battery) of the power supply unit 17 are housed in a rectangular parallelepiped thin case 31 formed of metal, resin, or the like. A pocket through which an ID card, on which ID information such as the name or team of the wearer is displayed, is inserted may be provided in the case 31. In addition, such ID information or the like may be printed on the surface of the case 31, or a seal on which the ID information or the like is described may be attached to the surface of the case 31.

The first to third microphones 111 to 113 are provided in the hanging string 40 (hereinafter, referred to as microphones 111 and 112 or microphones 111 to 113 when the first to third microphones 111 to 113 are not distinguished from each other). The microphones 111 to 113 are connected to the first to third amplifiers 131 to 133 housed in the apparatus body 30 by cables (electric wires or the like) passing through the inside of the hanging string 40. As materials of the hanging string 40, it is possible to use known various materials, such as leather, synthetic leather, cotton, other natural fibers, synthetic fiber using resin, and metal. In addition, coating processing using silicon resin, fluorine resin, or the like may be performed.

The hanging string 40 has a cylindrical structure, and the microphones 111 to 113 are housed inside the hanging string 40. By providing the microphones 111 to 113 inside the hanging string 40, it is possible to prevent damage or contamination of the microphones 111 to 113, and it is suppressed that a participant in a dialogue is aware of the existence of the microphones 111 to 113. In addition, the first microphone 111 disposed at the position far from the mouth (speaking portion) of the wearer may be provided in the apparatus body 30 so as to be housed in the case 31. In the present exemplary embodiment, a case where the first microphone 111 is provided in the hanging string 40 will be described as an example.

Referring to FIG. 2, the first microphone 111 is provided at the end (for example, a position within 10 cm from a connection portion) of the hanging string 40 connected to the apparatus body 30. Accordingly, the first microphone 111 is disposed at the position distant from the mouth (speaking portion) of the wearer by about 30 cm to 40 cm in a state where the wearer wears the hanging string 40 on the neck so that the apparatus body 30 is hung from the neck. In addition, also when the first microphone 111 is provided in the apparatus body 30, the distance from the mouth (speaking portion) of the wearer to the first microphone 111 is almost the same as above.

The second microphone 112 is provided at the position (for example, a position of about 20 cm to 30 cm from a connection portion) distant from the end of the hanging string 40 connected to the apparatus body 30. Accordingly, in a state where the wearer wears the hanging string 40 on the neck so that the apparatus body 30 is hung from the neck, the second microphone 112 is located on the neck (for example, a position equivalent to the collarbone) of the wearer and is disposed at the position distant from the mouth (speaking portion) of the wearer by about 10 cm to 20 cm.

In addition, the third microphone 113 is provided at the position (for example, a position of about 20 cm to 30 cm from a connection portion) distant from the end of the hanging string 40 connected to the apparatus body 30. Accordingly, similar to the second microphone 112, in a state where the wearer wears the hanging string 40 on the neck so that the apparatus body 30 is hung from the neck, the third microphone 113 is located on the neck (for example, a position equivalent to the collarbone) of the wearer and is disposed at the position distant from the mouth (speaking portion) of the wearer by about 10 cm to 20 cm.

In addition, in the present exemplary embodiment, the second and third microphones 112 and 113 are provided so that their positions in the direction of the wearer's shoulder are different. The second microphone 112 is disposed at the right shoulder side of the wearer, and the third microphone 113 is disposed at the left shoulder side of the wearer.

More specifically, in the present exemplary embodiment, the hanging string 40 formed in an annular shape is hung on the neck of the wearer and is pulled downward by the apparatus body 30, to hanging string 40. As a result, a first portion 41, which extends from a portion connected to the apparatus body 30 toward the back of the neck of the wearer through the right shoulder side of the wearer, and a second portion 42, which starts from a portion connected to the apparatus body 30 and extends toward the back of the neck of the wearer through the left shoulder side of the wearer, are provided in the hanging string 40. In addition, in the present exemplary embodiment, the second microphone 112 is fixed to the first portion 41, and the third microphone 113 is fixed to the second portion 42.

Here, the microphones 111 to 113 are not limited to being provided in the hanging string 40 as described above, and the wearer may wear the microphones 111 to 113 using various methods. For example, each of the first to third microphones 111 to 113 may be separately fixed to clothes using a pin or the like. In addition, it is also possible to prepare a dedicated mounting fixture designed so that each of the first to third microphones 111 to 113 is fixed at a desired position.

In addition, the configuration of the apparatus body 30 is not limited to the configuration shown in FIG. 2 in which the apparatus body 30 is connected to the hanging string 40 so as to be hung from the neck of the wearer, and the apparatus body 30 may be formed as a device which may be easily carried. For example, the apparatus body 30 may be mounted on clothes or the body using a clip or a belt instead of the hanging string in the present exemplary embodiment, or the apparatus body 30 may be simply carried in a pocket or the like.

In addition, mobile phones or known portable electronic information terminals may be configured to realize a function of receiving a voice signal from the microphones 111 to 113 and amplifying and analyzing the voice signal. Here, when the first microphone 111 is provided in the apparatus body 30, it is necessary to hold the positional relationship between the first and second microphones 111 and 112 and the positional relationship between the first and third microphones 111 and 113 as described above. Accordingly, the position of the apparatus body 30 at the time of carrying is specified.

In addition, the microphones 111 to 113 and the apparatus body 30 (or the voice analysis unit 15) may be wirelessly connected to each other instead of being connected using a cable. In addition, although the first to third amplifiers 131 to 133, the voice analysis unit 15, the data transmission unit 16, and the power supply unit 17 are housed in the single case 31 in the above example of the configuration, they may be grouped into plural parts. For example, the power supply unit 17 may be connected to an external power supply without being housed in the case 31.

Identification of a Speaker (Wearer and Others) Based on Non-Linguistic Information of Recorded Voice Next, a method of identifying a speaker in the present exemplary embodiment will be described.

Moreover, in the following explanation, an identification method when two microphones of the first and second microphones 111 and 112 are used will be described first, and the basic aspect of the present exemplary embodiment will be described. Then, an identification method when three microphones of the first to third microphones 111 to 113 are used will be described.

In the present exemplary embodiment, it is determined whether the speaker of the recorded voice is the wearer or others. In addition, in the present exemplary embodiment, speaker identification is performed on the basis of the non-linguistic information, such as sound pressure (volume input to the microphones 111 and 112) instead of the linguistic information acquired using morphological analysis or dictionary information of the information regarding the recorded voice. That is, a speaker of the voice is identified from the speaking situation specified by the non-linguistic information instead of the content of speaking specified by the linguistic information.

As described with reference to FIGS. 1 and 2, in the present exemplary embodiment, the first microphone 111 of the terminal apparatus 10 is disposed at the position far from the mouth (speaking portion) of the wearer and the second microphone 112 is disposed at the position near the mouth (speaking portion) of the wearer. That is, assuming that the mouth (speaking portion) of the wearer is a sound source, the distance between the first microphone 111 and the sound source is greatly different from the distance between the second microphone 112 and the sound source.

Specifically, the distance between the first microphone 111 and the sound source is about 1.5 to 4 times the distance between the second microphone 112 and the sound source. Here, sound pressure of the recorded voice in each of the microphones 111 and 112 decreases (distance decrease) as the distance between each of the microphones 111 and 112 and the sound source increases. Therefore, for the voice of the wearer, the sound pressure of the recorded voice in the first microphone 111 is greatly different from the sound pressure of the recorded voice in the second microphone 112.

On the other hand, assuming that the mouth (speaking portion) of a person other than the wearer (another person) is a sound source, the distance between the first microphone 111 and the sound source and the distance between the second microphone 112 and the sound source do not change greatly since another person is separated from the wearer. Although there may be a difference between both the distances depending on the position of another person with respect to the wearer, the distance between the first microphone 111 and the sound source is not several times the distance between the second microphone 112 and the sound source except for the case when the mouth (speaking portion) of the wearer is a sound source. Therefore, for the voice of another person, the sound pressure of the recorded voice in the first microphone 111 is not largely different from the sound pressure of the recorded voice in the second microphone 112 as in the case of the voice of the wearer.

Figure 3:
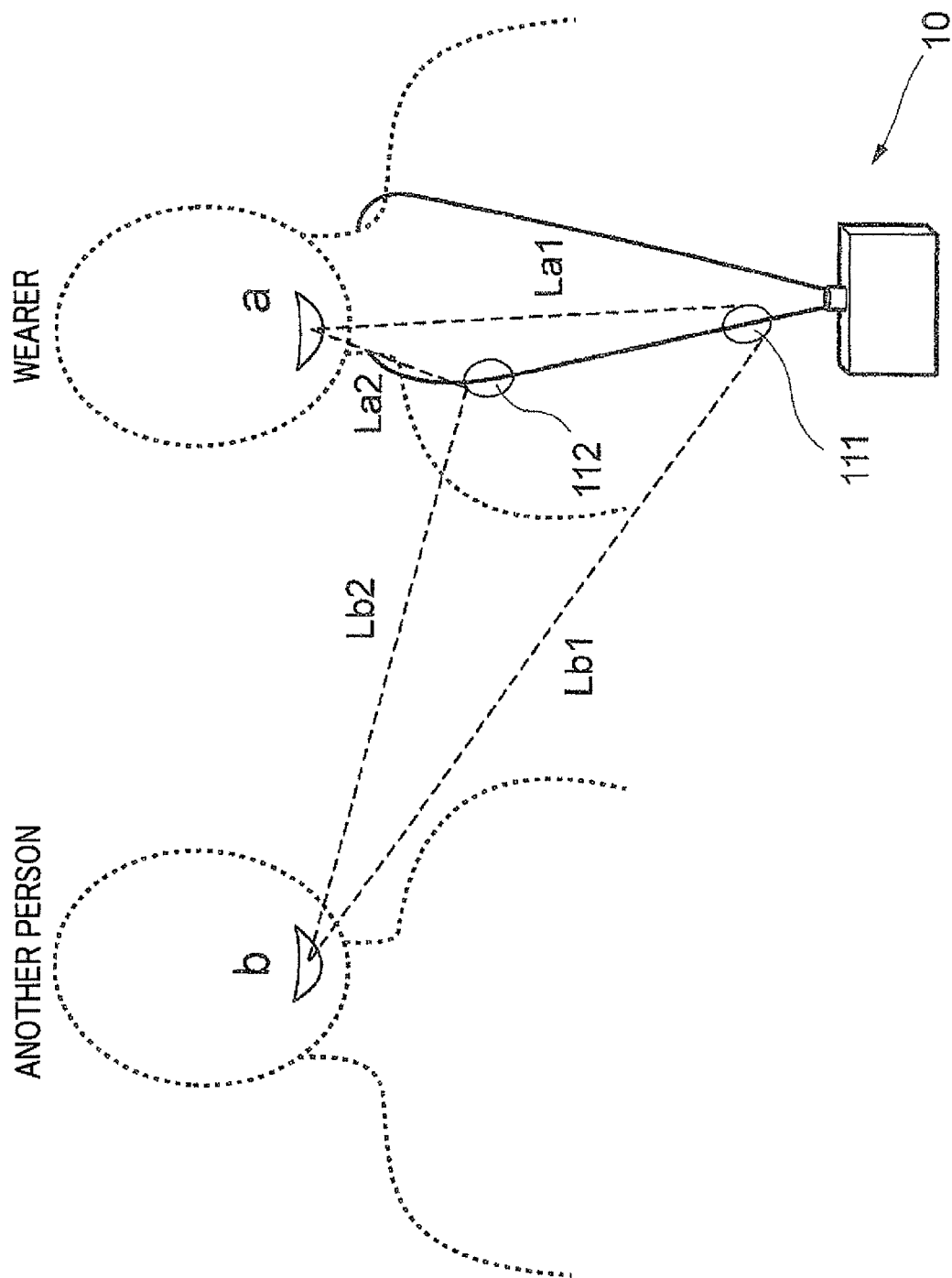
FIG. 3 is a view showing the positional relationship between mouths (speaking portions) of a wearer and another person and a microphone.

FIG. 3 is a view showing the positional relationship between mouths (speaking portions) of a wearer and another person and the microphones 111 and 112.

In the relationship shown in FIG. 3, the distance between a sound source a, which is a mouth (speaking portion) of the wearer, and the first microphone 111 is set to La1 and the distance between the sound source a and the second microphone 112 is set to La2. In addition, the distance between a sound source b, which is a mouth (speaking portion) of another person, and the first microphone 111 is set to Lb1 and the distance between the sound source b and the second microphone 112 is set to Lb2. In this case, the following relationship is satisfied.

$$La1 > La2 (La1 \cong 1.5 \times La2 \sim 4 \times La2)$$

$$Lb1 \cong Lb2$$

Figure 4:
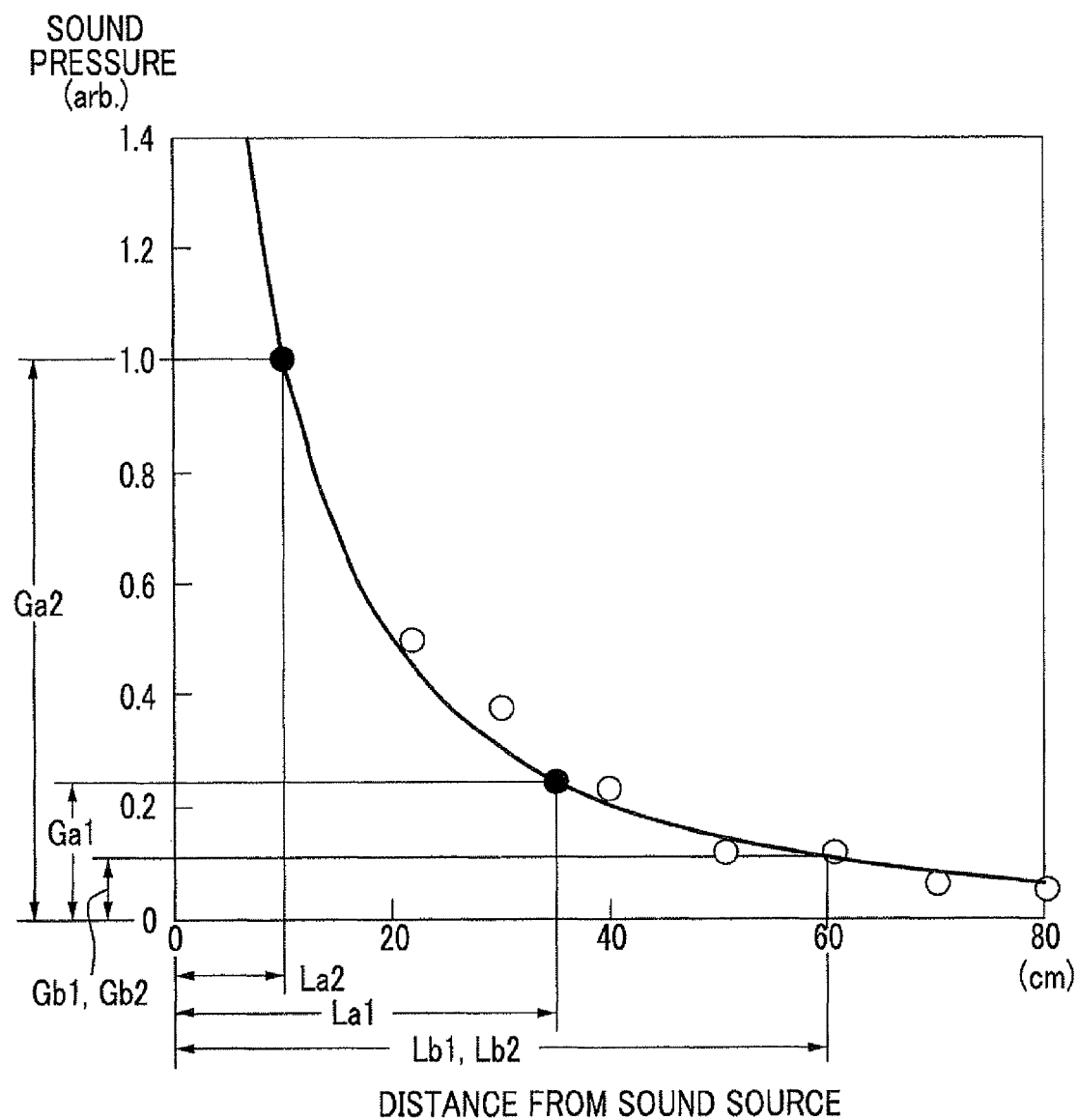
FIG. 4 is a view showing the relationship of sound pressure (input volume) and the distance between a microphone and a sound source.

FIG. 4 is a view showing the relationship of the distance between each of the microphones 111 and 112 and the sound source and the sound pressure (input volume).

As described above, the sound pressure distance-decreases with the distance between each of the microphones 111 and 112 and the sound source. In FIG. 4, when sound pressure Ga1 in the case of the distance La1 is compared with sound pressure Ga2 in the case of the distance La2, the sound pressure Ga2 is about 4 times the sound pressure Ga1. On the other hand, since the distances Lb1 and Lb2 are approximately equal, sound pressure Gb1 in the case of the distance Lb1 and sound pressure Gb2 in the case of the distance Lb2 are almost equal.

In the present exemplary embodiment, therefore, a voice of the wearer and voices of others in the recorded voices are identified using the difference of the sound pressure ratio. In addition, although the distances Lb1 and Lb2 are set to 60 cm in the example shown in FIG. 4, it is meaningful that the sound pressure Gb1 and the sound pressure Gb2 are almost equal, and the distance Lb1 and Lb2 are not limited to the values shown in FIG. 4.

Figure 5:
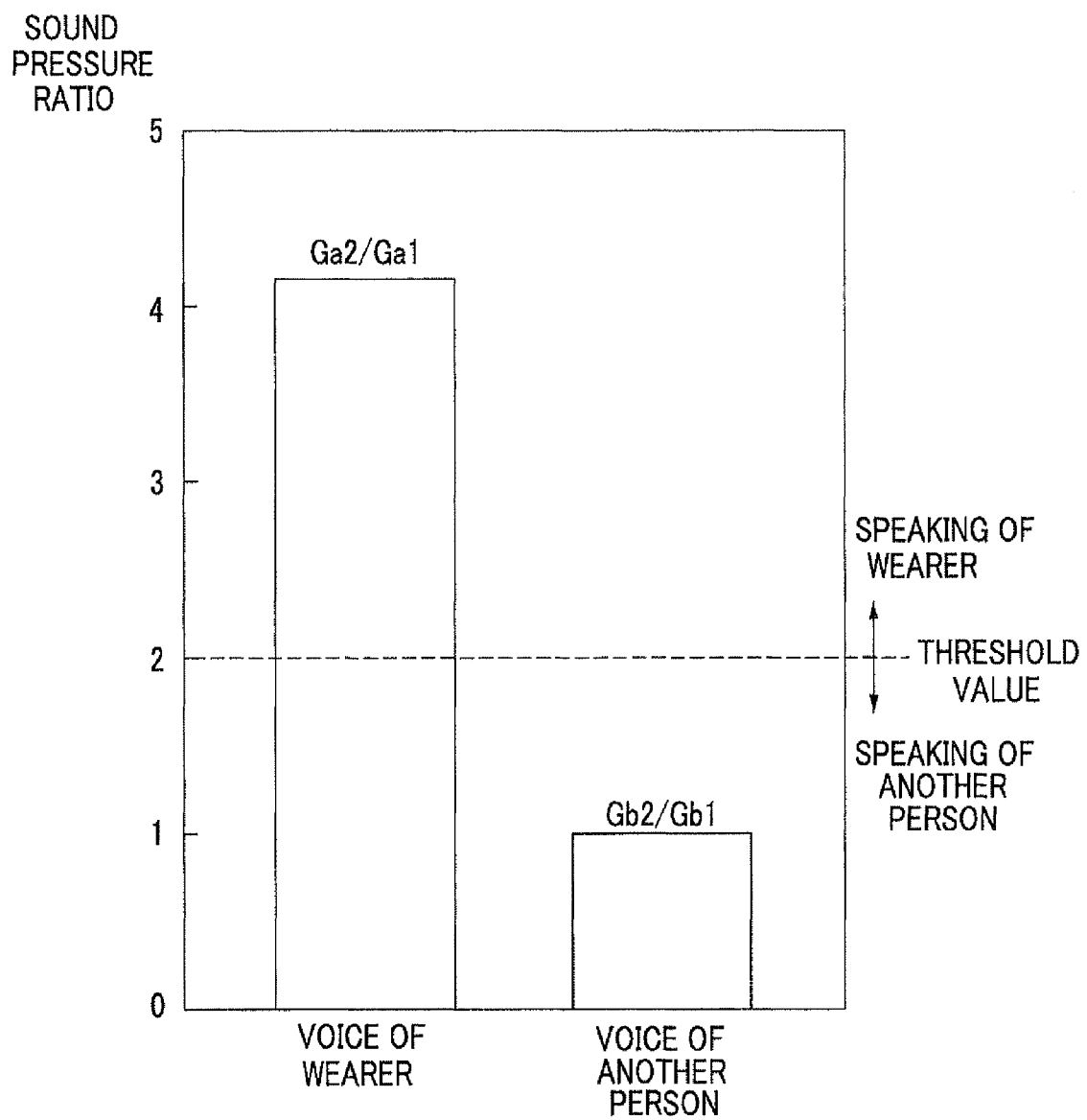
FIG. 5 is a view showing a method of identifying a voice of a wearer and a voice of another person.

FIG. 5 is a view showing a method of identifying a voice of a wearer and a voice of another person.

As described with reference to FIG. 4, for the voice of the wearer, the sound pressure Ga2 of the second microphone 112 is several times (for example, about 4 times) the sound pressure Ga1 of the first microphone 111. In addition, for the voice of another person, the sound pressure Gb2 of the second microphone 112 is almost equal to (about 1 time) the sound pressure Gb1 of the first microphone 111.

In the present exemplary embodiment, therefore, a threshold value of the ratio between the sound pressure of the second microphone 112 and the sound pressure of the first microphone 111 is set. In addition, a voice with a larger sound pressure ratio than the threshold value is determined to be the voice of the wearer, and a voice with a smaller sound pressure ratio than the threshold value is determined to be the voice of another person. In the example shown in FIG. 5, the threshold value is set to 2. Since the sound pressure ratio Ga2/Ga1 exceeds the threshold value 2, the voice is determined to be the voice of the wearer. In addition, since the sound pressure ratio Gb2/Gb1 is smaller than the threshold value 2, the voice is determined to be the voice of another person.

Incidentally, not only the voice but also so-called noise, such as environmental sounds, is included in the voice recorded by the microphones 111 and 112. The relationship of the distance between the sound source of noise and each of the microphones 111 and 112 is similar to that in the case of voices of others. That is, according to the example shown in FIGS. 4 and 5, assuming that the distance between a sound source c of noise and the first microphone 111 is set to Lc1 and the distance between the sound source c of noise and the second microphone 112 is set to Lc2, the distances Lc1 and Lc2 are approximately equal. In addition, the sound pressure ratio Gc2/Gc1 in recorded voices of the microphones 111 and 112 is smaller than the threshold value 2. However, such noise is separated and removed from the voice by performing filtering processing based on the known technique using a band pass filter, a gain filter, or the like.

Example of an Operation of a Terminal Apparatus

Figure 6:
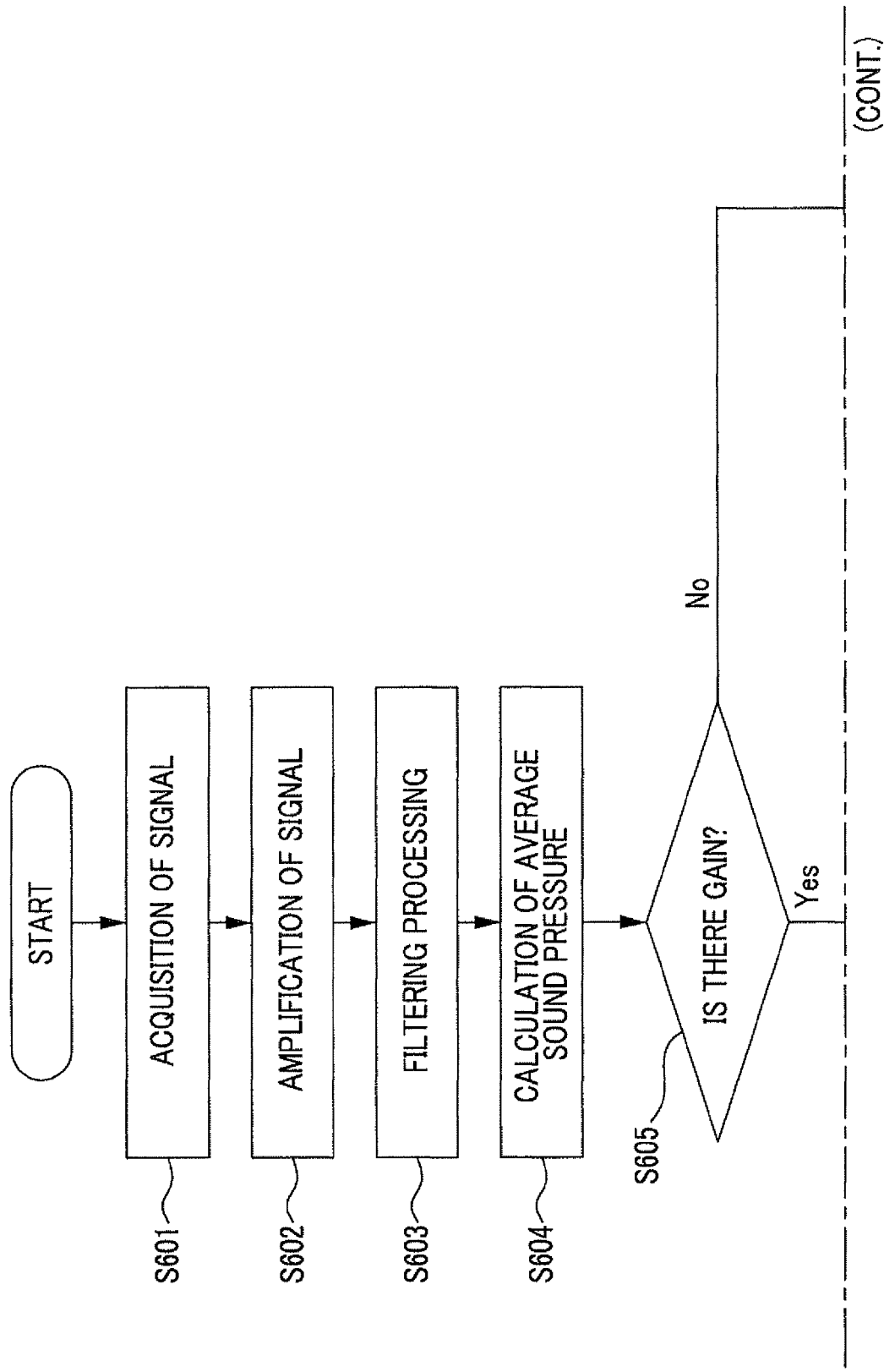
FIG. 6 is a flow chart showing the basic operation of a terminal apparatus.

FIG. 6 is a flow chart showing the basic operation of the terminal apparatus 10.

As shown in FIG. 6, when the microphones 111 and 112 of the terminal apparatus 10 acquire voices, electric signals (voice signals) corresponding to the acquired voices are transmitted from the microphones 111 and 112 to the first and second amplifiers 131 and 132, respectively (step 601). When the voice signals from the microphones 111 and 112 are acquired, the first and second amplifiers 131 and 132 amplify the signals and transmit the amplified signals to the voice analysis unit 15 (step 602).

The voice analysis unit 15 performs filtering processing on the signal amplified by each of the first and second amplifiers 131 and 132 to remove noise components, such as environmental sounds, from the signal (step 603). Then, the voice analysis unit 15 calculates the average sound pressure in the recorded voice of each of the microphones 111 and 112 for the signal, from which noise components are removed, every fixed time unit (for example, few tenths of a second to few hundredths of a second) (step 604).

When there is a gain of the average sound pressure, which is calculated in step 604, in each of the microphones 111 and 112 (Yes in step 605), the voice analysis unit 15 determines that there is a voice (speaking has been done). Then, the voice analysis unit 15 calculates the ratio (sound pressure ratio) between the average sound pressure in the first microphone 111 and the average sound pressure in the second microphone 112 (step 606). Then, when the sound pressure ratio calculated in step 606 is larger than the threshold value (Yes in step 607), the voice analysis unit 15 determines that the voice is from the wearer (step 608). In addition, when the sound pressure ratio calculated in step 606 is smaller than the threshold value (No in step 607), the voice analysis unit 15 determines that the voice is from another person (step 609).

On the other hand, when there is no gain of the average sound pressure in each of the microphones 111 and 112 calculated in step 604 (No in step 605), the voice analysis unit 15 determines that there is no voice (speaking has not been performed) (step 610). In addition, regarding the determination in step 605, it may be determined that there is a gain when the value of the gain of average sound pressure is equal to or larger than the value set in advance, in consideration of a case where noise which is not removed by filtering processing in step 603 remains in the signal.

Then, the voice analysis unit 15 transmits the information (information regarding whether or not there is a voice and information regarding a speaker) obtained by the processing in steps 604 to 610, as an analysis result, to the host apparatus 20 through the data transmission unit 16 (step 611). In this case, the length of speaking time of each speaker (wearer or another person), the value of the gain of average sound pressure, and other additional information items may be transmitted to the host apparatus 20 together with the analysis result.

In addition, in the present exemplary embodiment, determination regarding whether the voice is a voice from the wearer or a voice from another person is performed by comparing the sound pressure of the first microphone 111 with the sound pressure of the second microphone 112. In the present exemplary embodiment, any kind of speaker identification may be performed if it is performed on the basis of the non-linguistic information extracted from the voice signals themselves acquired by the microphones 111 and 112, without being limited to the comparison of sound pressure.

For example, it is also possible to compare the voice acquisition time (output time of a voice signal) in the first microphone 111 with the voice acquisition time in the second microphone 112. In this case, since there is a large difference between the distance from the mouth (speaking portion) of the wearer to the first microphone 111 and the distance from the mouth (speaking portion) of the wearer to the second microphone 112, a difference of the voice acquisition time occurs to some extent for the voice of the wearer.

On the other hand, since there is a small difference between the distance from the mouth (speaking portion) to the first microphone 111 and the distance from the mouth (speaking portion) to the second microphone 112, a small difference of the voice acquisition time occurs for the voice of another person. Therefore, it is possible to set a threshold value of the time difference of voice acquisition time and to determine that the voice is from the wearer when the time difference of voice acquisition time is larger than the threshold value and determine that the voice is from another person when the time difference of voice acquisition time is smaller than the threshold value.

Incidentally, when the wearer speaks, the mouth (speaking portion) of the wearer does not remain in a fixed position, but the position changes with shaking of the wearer. Here, when the position changes so that the mouth of the wearer becomes far from the second microphone 112, the sound pressure ratio which is a ratio between the sound pressure of the second microphone 112 and the sound pressure of the first microphone 111 may not exceed the threshold value described above. As a result, the voice of the wearer may be recognized as voice of another person.

In other words, when the position changes so that the mouth of the wearer becomes far from the second microphone 112, the distance La1 (refer to FIG. 3) between the sound source a which is a mouth of the wearer and the first microphone 111 and the distance La1 between the sound source a and the second microphone 112 become similar. Accordingly, a difference in the sound pressure of the recorded voice in the microphones 111 and 112 is difficult to occur. In addition, in this case, the ratio between the sound pressure of the second microphone 112 and the sound pressure of the first microphone 111 may not exceed the threshold value described above. As a result, the voice of the wearer may be recognized as voice of another person.

This will be described more specifically with reference to FIG. 7 (view showing the relationship between a direction, in which the wearer faces, and the sound pressure of a recorded voice). As shown by the chain line in FIG. 7, the sound pressure of the recorded voice in the second microphone 112 changes with shaking of the wearer. The sound pressure in the second microphone 112 increases when the wearer faces the wearer's right shoulder side on which the second microphone 112 is provided, and the sound pressure in the second microphone 112 decreases when the wearer faces the wearer's left shoulder side that is an opposite side to the side on which the second microphone 112 is provided.

In addition, if the sound pressure in the second microphone 112 decreases, a difference between the sound pressure in the second microphone 112 and the sound pressure in the first microphone 111 is reduced as indicated by reference numeral 7A in FIG. 7. Moreover, in this case, the ratio between the sound pressure of the second microphone 112 and the sound pressure of the first microphone 111 may not exceed the threshold value set in advance as described above. As a result, the voice of the wearer may be recognized as voice of another person. For this reason, in the present exemplary embodiment, the third microphone 113 is also used in order to suppress the recognition of a wearer's voice as voice of another person.

FIG. 8 is a view showing the flow of processing when three microphones of the first to third microphones 111 to 113 are used.

In this processing, similar to the processing described above, the microphones 111 to 113 of the terminal apparatus 10 acquire voices first, and electric signals (voice signals) corresponding to the acquired voices are transmitted from the microphones 111 to 113 to the first to third amplifiers 131 to 133, respectively (step 801). When the voice signals from the microphones 111 to 113 are acquired, the first to third amplifiers 131 to 133 amplify the signals and transmit the amplified signals to the voice analysis unit 15 (step 802).

The voice analysis unit 15 performs filtering processing on the signal amplified by each of the first to third amplifiers 131 to 133 to remove noise components, such as environmental sounds, from the signal (step 803). Then, the voice analysis unit 15 calculates the average sound pressure in the recorded voice of each of the microphones 111 to 113 for the signal, from which noise components are removed, every fixed time unit (for example, few tenths of a second to few hundredths of a second) (step 804).

Then, when there is a gain of the average sound pressure, which is calculated in step 804, in each of the microphones 111 to 113 (Yes in step 805), the voice analysis unit 15 determines that there is a voice (speaking has been done), and also compares the average sound pressure in the second microphone 112 with the average sound pressure in the third microphone 113 and specifies the larger average sound pressure (step 806).

Then, the ratio (sound pressure ratio) between the larger average sound pressure specified in step 806 and the average sound pressure in the first microphone 111 is calculated (step 807). In other words, in the present exemplary embodiment, one average sound pressure which becomes the basis of the sound pressure ratio is calculated by comparing two average sound pressures, and the sound pressure ratio is calculated from the calculated one average sound pressure and the average sound pressure in the first microphone 111. Then, when the sound pressure ratio calculated in step 807 is larger than the threshold value (Yes in step 808), the voice analysis unit 15 determines that the voice is from the wearer (step 809). In addition, when the sound pressure ratio calculated in step 807 is smaller than the threshold value (No in step 808), the voice analysis unit 15 determines that the voice is from another person (step 810).

On the other hand, when there is no gain of the average sound pressure in each of the microphones 111 to 113 calculated in step 804 (No in step 805), the voice analysis unit 15 determines that there is no voice (speaking has not been performed) as described above (step 811). In addition, regarding the determination in step 805, it may be determined that there is a gain when the value of the gain of average sound pressure is equal to or larger than the fixed value as described above, in consideration of a case where noise which is not removed by filtering processing in step 803 remains in the signal. Then, the voice analysis unit 15 transmits the information (information regarding whether or not there is a voice and information regarding a speaker) obtained by the processing in steps 804 to 811, as an analysis result, to the host apparatus 20 through the data transmission unit 16 (step 812).

FIG. 9 is a view showing the sound pressure of each of the first and third microphones 111 and 113 when the wearer turns his or her head.

As described above, in the present exemplary embodiment, when the wearer faces the wearer's left shoulder side that is an opposite side to the side on which the second microphone 112 is provided, the sound pressure in the second microphone 112 decreases. On the other hand, the third microphone 113 is provided at the left shoulder side of the wearer. Accordingly, as indicated by the one-dotted chain line in FIG. 9, when the wearer faces the left shoulder side, the sound pressure in the third microphone 113 increases.

Moreover, in this case, the difference between the sound pressure in the third microphone 113 and the sound pressure in the first microphone 111 is larger than the difference between the sound pressure in the second microphone 112 and the sound pressure in the first microphone 111. Moreover, in the present exemplary embodiment, the sound pressure ratio is calculated on the basis of the sound pressure in the third microphone 113, which is the larger sound pressure, and the sound pressure in the first microphone 111 in step 807 described above. As a result, in the present exemplary embodiment, a possibility that the sound pressure ratio will exceed the above-described threshold value increases, and this suppresses the recognition of a wearer's voice as voice of another person.

Figure 10:
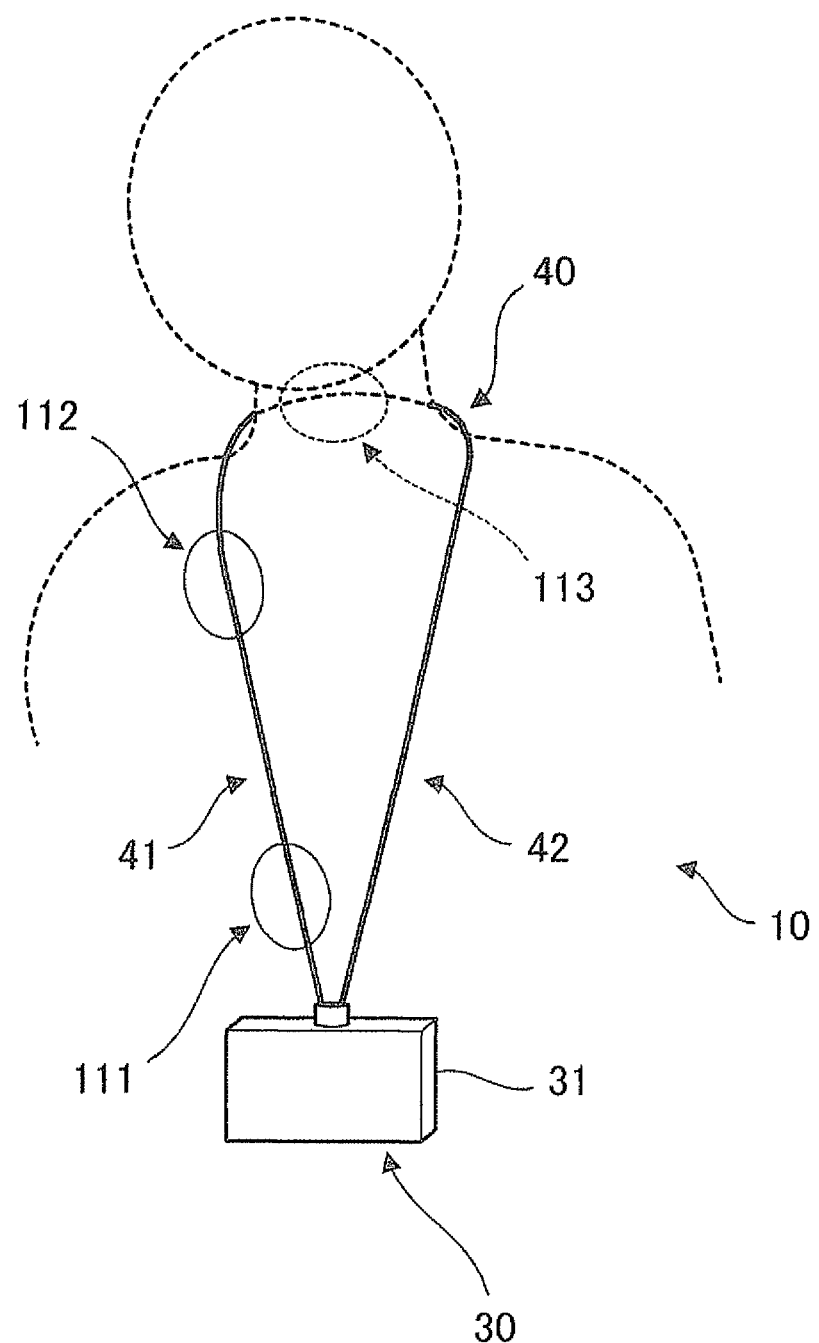
FIG. 10 is a view showing another example of the configuration of a terminal apparatus.

In addition, the position of the third microphone 113 is not limited to the position described above. For example, as shown in FIG. 10 (view showing another example of the configuration of the terminal apparatus 10), the third microphone 113 may also be provided in a portion of the hanging string 40 located on the back of the neck of the wearer.

Also in this case, as indicated by a double-dotted chain line in FIG. 11 (view showing the sound pressure of the first and third microphones 111 and 113 when wearer turns his or her head), when the wearer faces the left shoulder side, the sound pressure in the third microphone 113 increases. Moreover, also in this case, the difference between the sound pressure in the third microphone 113 and the sound pressure in the first microphone 111 is larger than the difference between the sound pressure in the second microphone 112 and the sound pressure in the first microphone 111. Moreover, in this case, the sound pressure ratio is calculated on the basis of the sound pressure in the third microphone 113 and the sound pressure in the first microphone 111 in step 807 described above.

As a result, also in this case, a possibility that the sound pressure ratio will exceed the above-described threshold value increases, and this suppresses the recognition of a wearer's voice as voice of another person. In addition, in the example of the configuration shown in FIG. 10, when the wearer faces the front without turning his or her head, the sound pressure in the second microphone 112 is larger than the sound pressure in the third microphone 113. Moreover, in this case, the sound pressure ratio is calculated from the sound pressure in the second microphone 112 and the sound pressure in the first microphone 111.

In addition, although two microphones are provided near the mouth of the wearer in the above, the number of microphones provided near the mouth of the wearer is not limited to two, and three or more microphones may be provided. Moreover, in this case, the sound pressure ratio is calculated on the basis of the largest sound pressure in the three or more microphones provided and the sound pressure in the first microphone 111.

Figure 12:
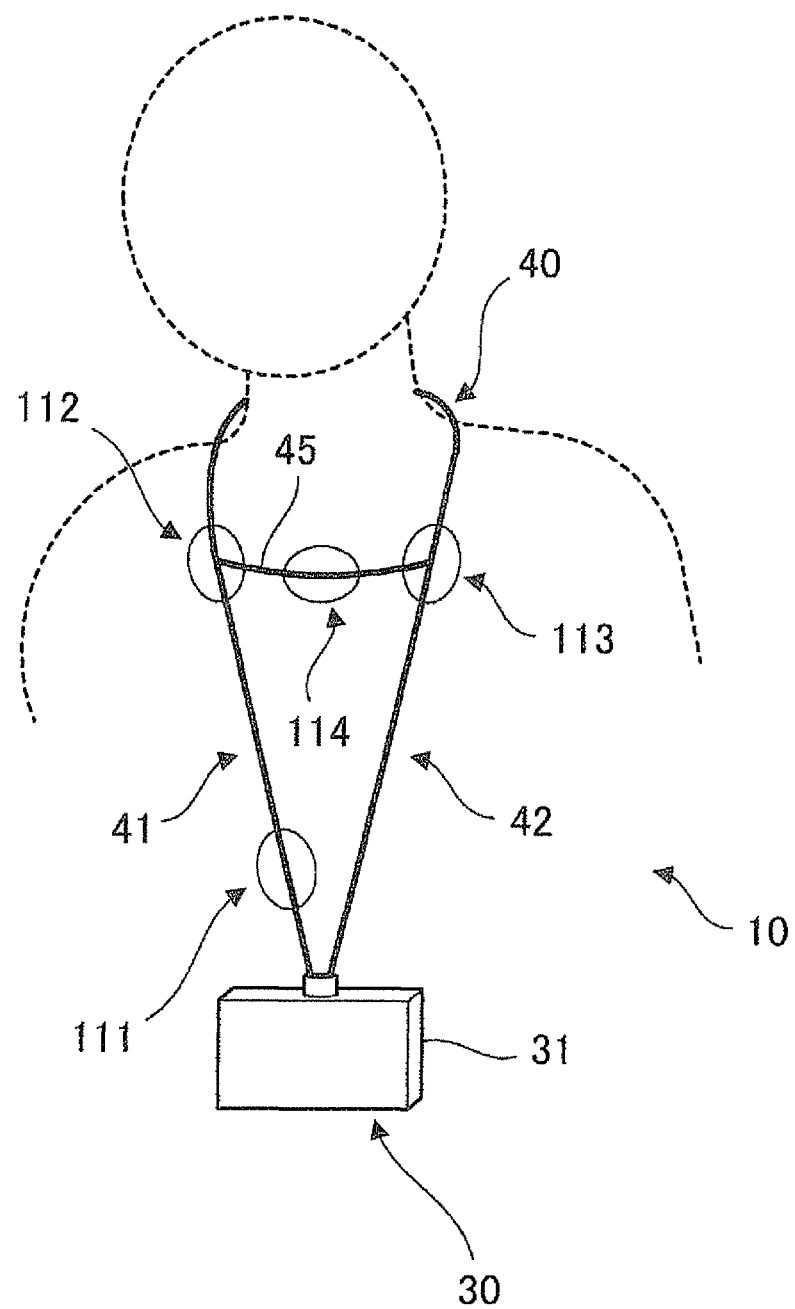
FIG. 12 is a view showing another example of the configuration of a terminal apparatus.

In addition, when the number of microphones provided near the mouth of the wearer is set to 3 or more, a configuration may be considered in which a fourth microphone 114 is provided between the second microphone 112 provided in the first portion 41 and the third microphone 113 provided in the second portion 42, for example, as shown in FIG. 12 (view showing another example of the configuration of the terminal apparatus 10). In addition, in the example of the configuration shown in FIG. 12, a connection string 45, which is provided between the first and second portions 41 and 42 and is connected to the first and second portions 41 and 42, is provided, and the fourth microphone 114 is provided in the connection string 45. In addition, since the connection string 45 is formed of rubber and has elasticity, the connection string 45 extends when the head of the wearer passes through an annular portion formed by the connection string 45 and the hanging string 40.

In addition, in the above, the case has been described in which the second and third microphones 112 and 113 are axisymmetrically disposed with the wearer's centerline (centerline from the head toward the feet which passes through a middle portion of the wearer in the shoulder width direction) as its axis of symmetry. However, the second and third microphones 112 and 113 may also be asymmetrically disposed with the centerline of the wearer as its axis of symmetry without being limited to the arrangement described above.

In addition, in the above, the case has been described in which the second and third microphones 112 and 113 are disposed such that the distance between the mouth of the wearer and the second microphone 112 becomes equal to the distance between the mouth of the wearer and the third microphone 113. However, as long as the second and third microphones 112 and 113 are located closer to the mouth of the wearer than the first microphone 111 is, the distance between the mouth of the wearer and the second microphone 112 may be different from the distance between the mouth of the wearer and the third microphone 113.

In addition, in the above, the case has been described in which speaker identification is performed on the basis of the sound pressure in the first microphone 111 and the larger one of the sound pressure in the second microphone 112 and the sound pressures in the third microphone 113. However, speaker identification may also be performed on the basis of the voice acquisition time in the first microphone 111 and the earlier one of the voice acquisition time (output time of a voice signal) in the second microphone 112 and the voice acquisition time in the third microphone 113.

In addition, in the above, the case has been described in which speaker identification is performed on the basis of the sound pressure ratio between the sound pressure in the first microphone 111 and the largest sound pressure in plural microphones disposed near the mouth of the wearer. However, it is also possible to calculate average sound pressure from the sound pressure in each of plural microphones disposed near the mouth of the wearer and to identify the speaker on the basis of the sound pressure ratio between the average sound pressure and the sound pressure in the first microphone 111.

Application Example of a System and Functions of a Host Apparatus

In the system according to the present exemplary embodiment, information regarding the speaking (hereinafter, referred to as speaking information) obtained as described above by the plural terminal apparatuses 10 are collected in the host apparatus 20. Using the information acquired from the plural terminal apparatuses 10, the host apparatus 20 performs various analyses according to the purpose or aspect of use of the system. Hereinafter, an example will be described in which the present exemplary embodiment is used as a system that acquires the information regarding communication of plural wearers.

Figure 13:
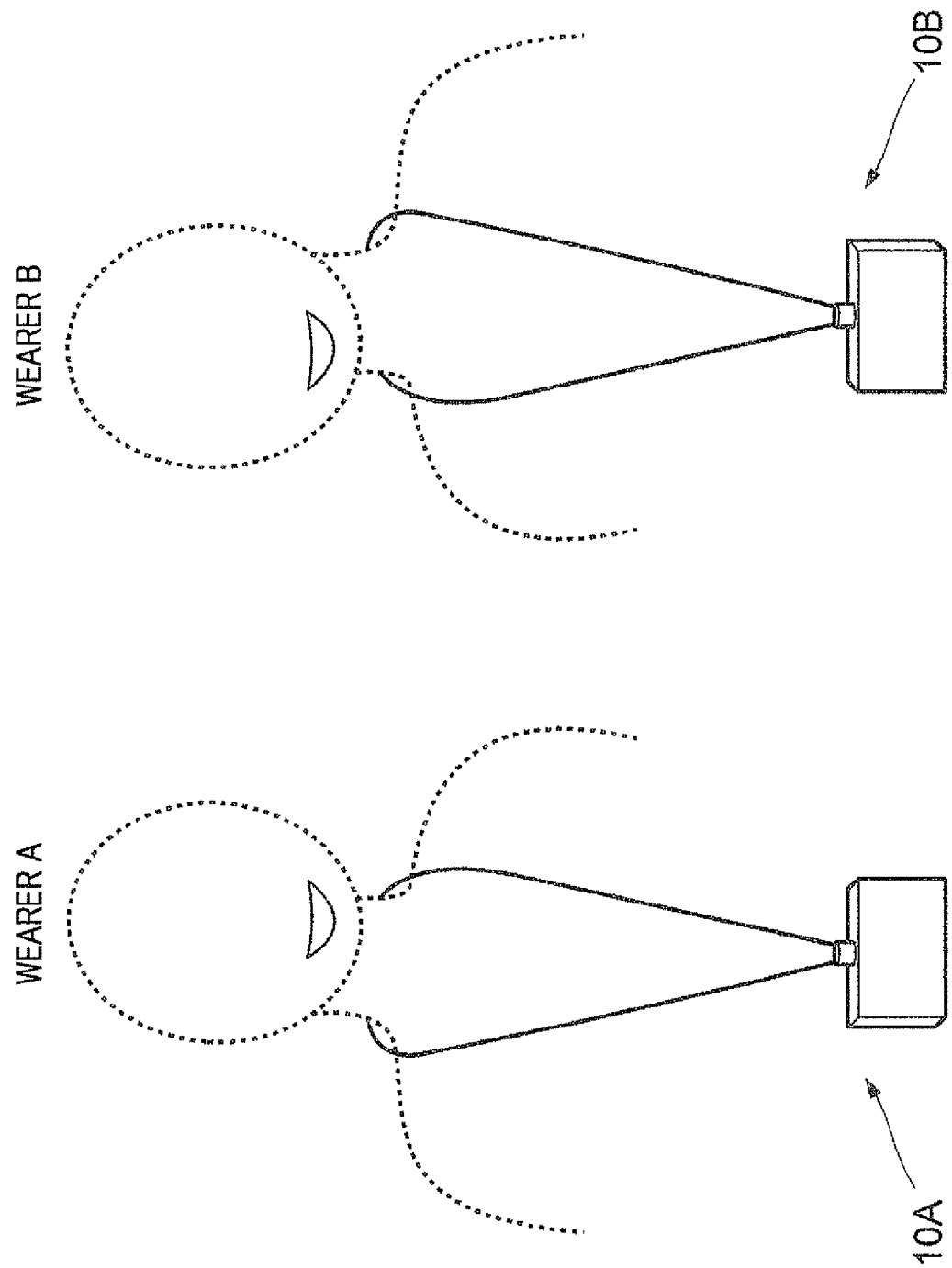
FIG. 13 is a view showing a situation where plural wearers who wear the terminal apparatus according to the exemplary embodiment have a conversation with each other.

FIG. 13 is a view showing a situation where plural wearers who wear the terminal apparatus 10 according to the present exemplary embodiment have a conversation with each other. FIG. 14 is a view showing an example of the speaking information of the terminal apparatuses 10A and 10B in the conversation situation shown in FIG. 13.

As shown in FIG. 13, a case is considered in which two wearers A and B each of whom wears the terminal apparatus 10 have a conversation with each other. In this case, a voice recognized as wearer's speaking in the terminal apparatus 10A of the wearer A is recognized as another person's speaking in the terminal apparatus 10B of the wearer B. On the contrary, a voice recognized as wearer's speaking in the terminal apparatus 10B is recognized as another person's speaking in the terminal apparatus 10A.

The speaking information is separately transmitted from the terminal apparatuses 10A and 10B to the host apparatus 20. In this case, identification results of a speaker (wearer and another person) in the speaking information acquired from the terminal apparatus 10A and the speaking information acquired from the terminal apparatus 10B are opposite as shown in FIG. 14, but the information showing the speaking situation, such as the length of speaking time or the speaker change timing, is similar.

Therefore, the host apparatus 20 in this application example determines that such information items indicate the same speaking situation by comparing the information acquired from the terminal apparatus 10A with the information acquired from the terminal apparatus 10B, and recognizes that the wearers A and B have a conversation. Here, at least the time information regarding the speaking, such as the length of speaking time in each speaking of each speaker, start time and end time of each speaking, and speaker change time (timing), is used as the information showing the speaking situation. In addition, in order to determine the speaking situation related to a specific conversation, only some of the time information regarding the speaking may be used, or other information may be additionally used.

Figure 15:
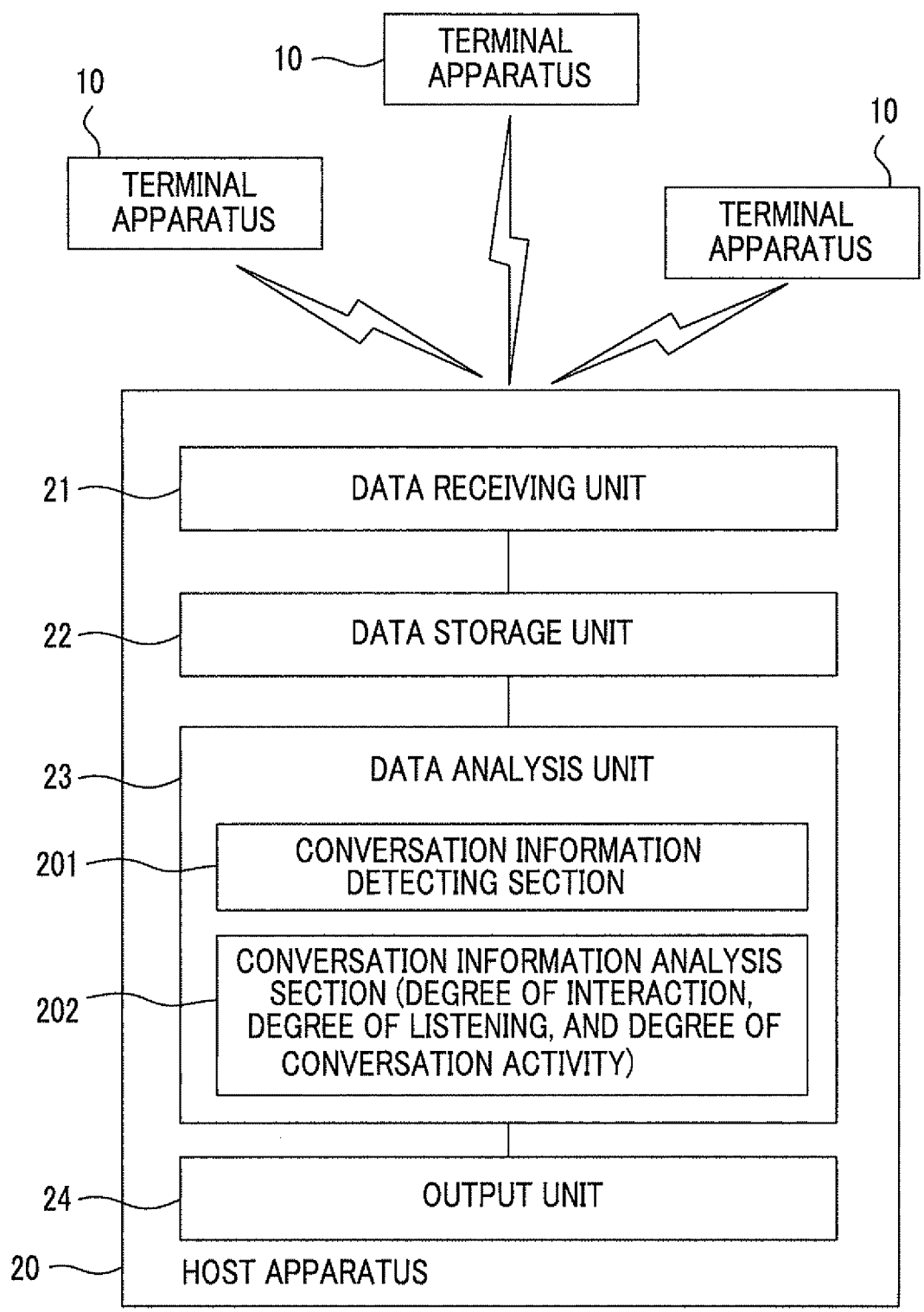
FIG. 15 is a view showing an example of the functional configuration of a host apparatus in an application example.

FIG. 15 is a view showing an example of the functional configuration of the host apparatus 20 in this application example.

In this application example, the host apparatus 20 includes a conversation information detecting section 201 that detects the speaking information (hereinafter, referred to as conversation information) from the terminal apparatus 10 of the wearer in conversation, among the speaking information items acquired from the terminal apparatus 10, and a conversation information analysis section 202 that analyzes the detected conversation information. The conversation information detecting section 201 and the conversation information analysis section 202 are realized as a function of the data analysis unit 23.

Also from the terminal apparatus 10 other than the terminal apparatuses 10A and 10B, the speaking information is transmitted to the host apparatus 20. The speaking information from each terminal apparatus 10 which is received by the data receiving unit 21 is stored in the data storage unit 22. In addition, the conversation information detecting section 201 of the data analysis unit 23 reads the speaking information of each terminal apparatus 10 stored in the data storage unit 22 and detects the conversation information which is the speaking information related to a specific conversation.

As shown in FIG. 14, from the speaking information of the terminal apparatus 10A and the speaking information of the terminal apparatus 10B, the characteristic relationship which is different from the speaking information of other terminal apparatuses 10 is extracted. The conversation information detecting section 201 compares the speaking information that is acquired from each terminal apparatus 10 and is stored in the data storage unit 22, detects the speaking information with the above-described relationship from the speaking information acquired from the plural terminal apparatuses 10, and identifies it as conversation information related to the same conversation. The speaking information from the plural terminal apparatuses 10 is constantly transmitted to the host apparatus 20. Accordingly, the conversation information detecting section 201 determines whether or not the conversation information related to the specific conversation is included by performing the processing as described above while separating the speaking information in a fixed period sequentially, for example.

In addition, the conditions required when the conversation information detecting section 201 detects the conversation information related to a specific conversation from the speaking information of the plural terminal apparatuses 10 are not limited to the relationship shown in FIG. 14 described above. Any detection method may be used as long as it is possible to identify the conversation information related to a specific conversation from plural speaking information items.

In addition, although the case where two wearers each of whom wears the terminal apparatus 10 have a conversation is shown in the above example, the number of persons participating in a conversation is not limited to two persons. When three or more wearers have a conversation, the terminal apparatus 10 worn by each wearer recognizes the voice of the wearer of the host apparatus as the voice of the wearer and distinguishes it from the voices of others (two or more persons). However, the information showing the speaking situation, such as speaking time or speaker change timing, is similar among the acquired information in each terminal apparatus 10. Therefore, similar to the case where two persons have a conversation, the conversation information detecting section 201 detects the speaking information acquired from the terminal apparatuses 10 of wearers participating in the same conversation and distinguishes it from the speaking information acquired from the terminal apparatuses 10 of wearers not participating in the conversation.

Then, the conversation information analysis section 202 analyzes the conversation information detected by the conversation information detecting section 201 and extracts the features of the conversation. In the present exemplary embodiment, as a specific example, the features of the conversation are extracted on the basis of three kinds of criteria for evaluation, that is, the degree of interaction, the degree of listening, and the degree of conversation activity. Here, the degree of interaction is assumed to indicate the balance of the speaking frequency of a conversation participant. The degree of listening is assumed to indicate the degree of listening to others in each conversation participant. The degree of conversation activity is assumed to indicate the density of speaking in the entire conversation.

The degree of interaction is specified by the number of times of speaker changes during the conversation and a variation in time taken until the speaker is changed (time for which one speaker speaks continuously). This may be obtained from the number of times of speaker changes and the time when the speaker change occurs in the conversation information in a fixed period. In addition, it is assumed that the value (level) of the degree of interaction increases as the number of times of speaker changes increases, that is, as a variation in continuous speaking time of each speaker decreases. This criterion for evaluation is common in all conversation information items (speaking information of each terminal apparatus 10) related to the same conversation.

The degree of listening is specified by the ratio of speaking time of each conversation participant and speaking time of others in conversation information. For example, in the following expression, it is assumed that the value (level) of the degree of listening increases as the value of speaking time of others increases.

Degree of listening=(speaking time of others)/(speaking time of a wearer)

This criterion for evaluation differs with the speaking information acquired from the terminal apparatus 10 of each conversation participant even in the conversation information related to the same conversation.

The degree of conversation activity is an index showing the so-called excitement of the conversation, and is specified by the ratio of silence time (time for which none of conversation participants speak) to the total conversation time. It is assumed that the value (level) of the degree of conversation activity increases as the total silence time becomes short (which means that any one of conversation participants speaks in the conversation). This criterion for evaluation is common in all conversation information items (speaking information of each terminal apparatus 10) related to the same conversation.

As described above, the features of a conversation related to the conversation information are extracted by the conversation information analysis of the conversation information analysis section 202. In addition, the way of participation of each participant in the conversation is specified by performing the analysis as described above. In addition, the above criteria for evaluation are just examples showing the features of a conversation, and criteria for evaluation according to the purpose or aspect of use of the system of the present exemplary embodiment may be set by adopting other evaluation criteria or giving a weighting to each item.

The tendency of communication in a group to which the wearer of the terminal apparatus 10 belongs may be analyzed by performing the above analysis for various kinds of conversation information detected by the conversation information detecting section 201 among the speaking information items stored in the data storage unit 22. Specifically, the tendency of conversation in a wearer's group may be determined by checking the number of conversation participants, conversation time, correlation between the values, such as the degree of interaction and the degree of conversation activity, and the occurrence frequency of conversation, for example.

In addition, the communication tendency of each wearer may be analyzed by performing the analysis as described above for plural conversation information items of a specific wearer. The way of participation of a specific wearer in the conversation may have a certain tendency according to the conditions, such as a conversation partner or the number of conversation participants. Therefore, it may be expected that the features, such as "the speaking level increases in a conversation with a specific partner" or "the degree of listening becomes large if the number of conversation participants increases", are detected by examining the plural conversation information items in a specific wearer.

In addition, the speaking information identification processing and the conversation information analysis processing described above just show the application example of the system according to the present exemplary embodiment, and do not limit the purpose or aspect of use of the system according to the present exemplary embodiment, the function of the host apparatus 20, and the like. The processing function for executing various kinds of analyses and examinations for the speaking information acquired by the terminal apparatus 10 according to the present exemplary embodiment may be realized as a function of the host apparatus 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A voice analyzer comprising:
   a first voice acquisition unit that is provided in a place where a distance of a sound wave propagation path from the mouth of a user is a first distance and that acquires a voice of the user;
   a plurality of second voice acquisition units that are provided in places where distances of sound wave propagation paths from the mouth of the user are smaller than the first distance and that acquire a voice of the user; and
   an identification unit that identifies whether the voices acquired by the first and second voice acquisition units are voices of the user or voices of others excluding the user on the basis of a result of comparison between first sound pressure of a voice signal of the voice acquired by the first voice acquisition unit and second sound pressure calculated from sound pressure of a voice signal of the voice acquired by each of the plurality of second voice acquisition units.

2. The voice analyzer according to claim 1,
   wherein the largest sound pressure of the voice signals of the voices acquired by the second voice acquisition units is calculated as the second sound pressure, and
   the identification unit identifies whether the voices acquired by the first and second voice acquisition units are voices of the user or voices of others excluding the user on the basis of a result of comparison between the first sound pressure and the largest sound pressure of the voice signals.

3. The voice analyzer according to claim 1,
   wherein the plurality of second voice acquisition units are provided in different places in a shoulder width direction of the user.

4. The voice analyzer according to claim 2,
   wherein the plurality of second voice acquisition units are provided in different places in a shoulder width direction of the user.

5. A voice analyzer comprising:
   an apparatus body;

a hanging string that is connected to the apparatus body and is used when the apparatus body is hung from a neck of a user;

a first voice acquisition unit that is provided in the hanging string or the apparatus body, that is provided in a place where a distance of a sound wave propagation path from the mouth of the user, which is a distance when the apparatus body is hung from the neck of the user, is a first distance, and that acquires a voice of the user;

a plurality of second voice acquisition units that are provided in the hanging string, that are provided in places where distances of sound wave propagation paths from the mouth of the user, which are distances when the apparatus body is hung from the neck of the user, are smaller than the first distance, and that are provided such that positions in a shoulder width direction of the user that are positions when the apparatus body is hung from the neck of the user are different;

an identification unit that is provided in the apparatus body and that identifies whether the voices acquired by the first and second voice acquisition units are voices of the user or voices of others excluding the user on the basis of a result of comparison between first sound pressure of a voice signal of the voice acquired by the first voice acquisition unit and second sound pressure calculated from sound pressure of a voice signal of the voice acquired by each of the plurality of second voice acquisition units; and a transmission unit that is provided in the apparatus body and that transmits information regarding the voice signal, which includes an identification result of the identification unit, to an external device.

6. The voice analyzer according to claim 5,
wherein the hanging string has an annular portion so that the neck of the user passes through the annular portion,
a first portion, which extends from the back of the neck of the user toward the suspended apparatus body through a right shoulder side of the user, and a second portion, which extends from the back of the neck toward the suspended apparatus body through a left shoulder side of the user, are provided in the annular portion of the hanging string, and
one of the plurality of second voice acquisition units is provided in one of the first and second portions of the hanging string, and another one of the plurality of second voice acquisition units is provided in the other one of the first and second portions.

7. The voice analyzer according to claim 5,
wherein the largest sound pressure of the voice signals of the voices acquired by the second voice acquisition units is calculated as the second sound pressure, and
the identification unit identifies whether the voices acquired by the first and second voice acquisition units are voices of the user or voices of others excluding the user on the basis of a sound pressure ratio that is a ratio between the first sound pressure and the largest sound pressure of the voice signals.

8. The voice analyzer according to claim 6,
wherein the largest sound pressure of the voice signals of the voices acquired by the second voice acquisition units is calculated as the second sound pressure, and
the identification unit identifies whether the voices acquired by the first and second voice acquisition units are voices of the user or voices of others excluding the user on the basis of a sound pressure ratio that is a ratio between the first sound pressure and the largest sound pressure of the voice signals.

9. The voice analyzer according to claim 5,
wherein the hanging string has a cylindrical structure, and
each of the second voice acquisition units provided in the hanging string is provided at the inside of the hanging string.

10. The voice analyzer according to claim 6,
wherein the hanging string has a cylindrical structure, and
each of the second voice acquisition units provided in the hanging string is provided at the inside of the hanging string.

11. The voice analyzer according to claim 7,
wherein the hanging string has a cylindrical structure, and
each of the second voice acquisition units provided in the hanging string is provided at the inside of the hanging string.

12. The voice analyzer according to claim 8,
wherein the hanging string has a cylindrical structure, and
each of the second voice acquisition units provided in the hanging string is provided at the inside of the hanging string.

13. A voice analysis system comprising:
a terminal apparatus worn by a user; and
a host apparatus that acquires information from the terminal apparatus,
wherein the terminal apparatus includes:
a first voice acquisition unit that is provided in a place where a distance of a sound wave propagation path from the mouth of a user is a first distance and that acquires a voice of the user;
a plurality of second voice acquisition units that are provided in places where distances of sound wave propagation paths from the mouth of the user are smaller than the first distance and that acquire a voice of the user;
an identification unit that identifies whether the voices acquired by the first and second voice acquisition units are voices of the user or voices of others excluding the user on the basis of a result of comparison between first sound pressure of a voice signal of the voice acquired by the first voice acquisition unit and second sound pressure calculated from sound pressure of a voice signal of the voice acquired by each of the plurality of second voice acquisition units; and
a transmission unit that transmits speaking information, which is information regarding the voice signal including an identification result of the identification unit, to the host apparatus, and
the host apparatus includes:
a receiving unit that receives the speaking information transmitted from the terminal apparatus;
a storage unit that stores the speaking information received by the receiving unit for the terminal apparatus that transmits the speaking information;
an analysis unit that analyzes the speaking information stored in the storage unit; and
an output unit that outputs an analysis result of the analysis unit.

14. The voice analysis system according to claim 13,
wherein as one analysis, the analysis unit of the host apparatus compares the speaking information acquired from the plurality of terminal apparatuses and identifies speaking information of a user participating in a specific conversation on the basis of time information regarding a voice included in the speaking information.

* * * * *